US009196877B2

(12) United States Patent
Bohman et al.

(10) Patent No.: US 9,196,877 B2
(45) Date of Patent: Nov. 24, 2015

(54) BATTERY CELL ISOLATION SYSTEM

(71) Applicant: The Boeing Company, Chicago, IL (US)

(72) Inventors: Michael W. Bohman, Long Beach, CA (US); Richard W. Aston, Brea, CA (US)

(73) Assignee: THE BOEING COMPANY, Chicago, IL (US)

(*) Notice: Subject to any disclaimer, the term of this patent is extended or adjusted under 35 U.S.C. 154(b) by 0 days.

(21) Appl. No.: 14/578,762

(22) Filed: Dec. 22, 2014

(65) Prior Publication Data

US 2015/0107094 A1 Apr. 23, 2015

Related U.S. Application Data

(62) Division of application No. 13/033,201, filed on Feb. 23, 2011, now Pat. No. 8,916,282.

(51) Int. Cl.
| | |
|---|---|
| H01M 4/82 | (2006.01) |
| H01M 2/10 | (2006.01) |
| B64G 1/42 | (2006.01) |
| H01M 10/625 | (2014.01) |
| H01M 10/653 | (2014.01) |
| H01M 10/647 | (2014.01) |
| H01M 10/6555 | (2014.01) |
| H01M 10/6554 | (2014.01) |

(Continued)

(52) U.S. Cl.
CPC ............ *H01M 2/10* (2013.01); *B64G 1/425* (2013.01); *H01M 2/1077* (2013.01); *H01M 10/613* (2015.04); *H01M 10/625* (2015.04); *H01M 10/647* (2015.04); *H01M 10/653* (2015.04); *H01M 10/6554* (2015.04); *H01M 10/6555* (2015.04); *H01M 10/643* (2015.04); *H01M 2220/20* (2013.01)

(58) Field of Classification Search
CPC ............ H01M 10/625; H01M 10/653; H01M 10/647; H01M 10/6555; H01M 2/10
USPC ............................................... 29/623.4, 623.1
See application file for complete search history.

(56) References Cited

U.S. PATENT DOCUMENTS

| | | | |
|---|---|---|---|
| 3,480,251 A | 11/1969 | Pietrzak | |
| 5,763,116 A * | 6/1998 | Lapinski et al. | ............... 429/99 |
| D424,807 S | 5/2000 | Dembicks | |

(Continued)

FOREIGN PATENT DOCUMENTS

WO   WO 2009052928 A1 *   4/2009

OTHER PUBLICATIONS

Bohman et al., "Battery Cell Isolation System", U.S. Appl. No. 13/033,201, filed Feb. 23, 2011, 62 pages.

(Continued)

*Primary Examiner* — Milton I Cano
*Assistant Examiner* — Jimmy K Vo
(74) *Attorney, Agent, or Firm* — Yee & Associates, P.C.

(57) ABSTRACT

A method and apparatus comprising a number of battery cells, a housing having a plurality of channels, an assembly, and a number of grooves. The housing is configured to hold the number of battery cells. The assembly is configured to separate the number of battery cells from the housing in which the housing has the plurality of channels. The number of grooves is formed by the assembly and surfaces of the number of battery cells.

18 Claims, 18 Drawing Sheets

(51) Int. Cl.
   *H01M 10/613* (2014.01)
   *H01M 10/643* (2014.01)

(56) References Cited

U.S. PATENT DOCUMENTS

| | | |
|---|---|---|
| 6,653,018 B2 | 11/2003 | Takahashi et al. |
| 8,076,019 B2 | 12/2011 | Lohr et al. |
| 8,703,319 B1 | 4/2014 | Aston et al. |
| 2001/0038938 A1 | 11/2001 | Takahashi et al. |
| 2006/0134514 A1 | 6/2006 | Lenain et al. |
| 2007/0009787 A1 | 1/2007 | Straubel et al. |
| 2008/0311466 A1 | 12/2008 | Yang et al. |
| 2009/0004555 A1 | 1/2009 | Lohr et al. |
| 2010/0248000 A1* | 9/2010 | Damsohn et al. ............ 429/120 |
| 2014/0210416 A1 | 7/2014 | Aston et al. |

OTHER PUBLICATIONS

Office Action, dated Nov. 7, 2013, regarding U.S. Appl. No. 13/033,201, 21 pages.
Final Office Action, dated May 30, 2014, regarding U.S. Appl. No. 13/033,201, 19 pages.
Notice of Allowance, dated Aug. 15, 2014, regarding U.S. Appl. No. 13/033,201, 7 pages.
Office Action, dated Apr. 24, 2013, regarding U.S. Appl. No. 12/697,696, 22 pages.
Notice of Allowance, dated Nov. 22, 2013, regarding U.S. Appl. No. 12/697,696, 16 pages.

* cited by examiner

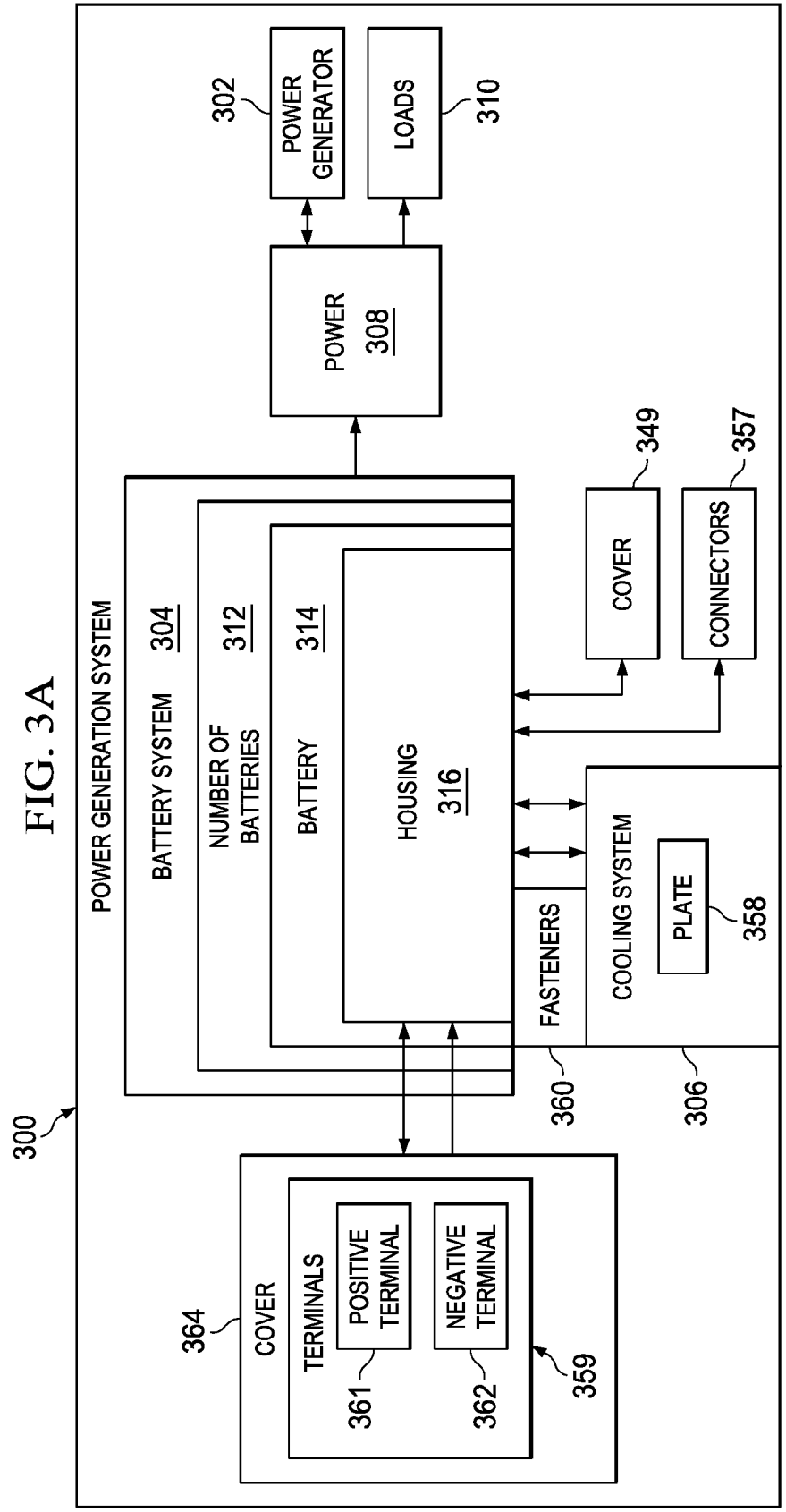

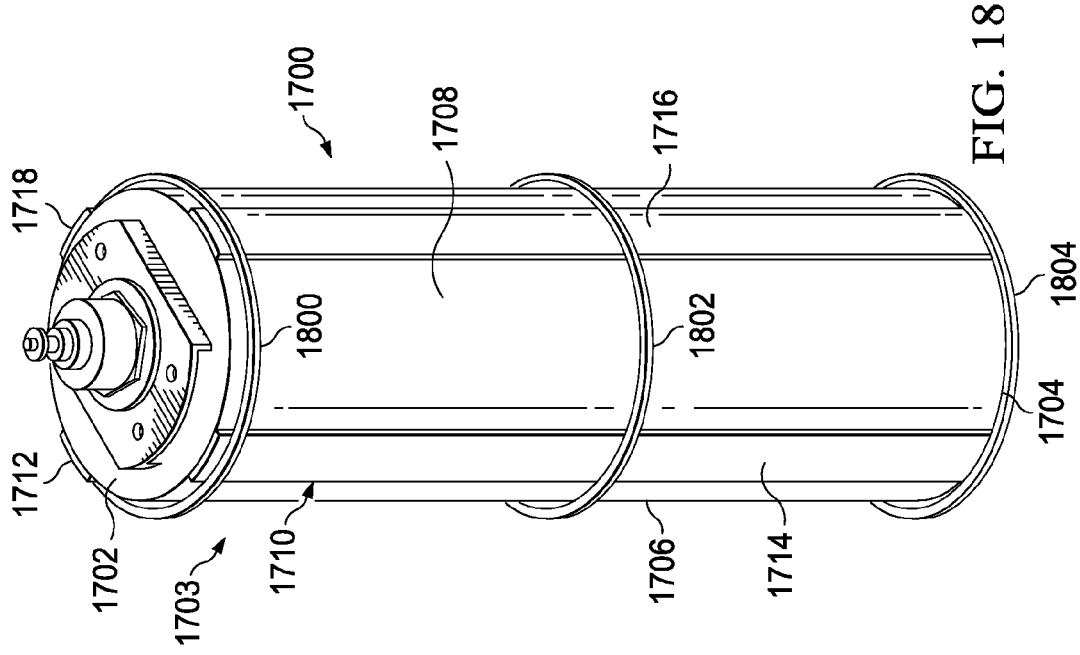
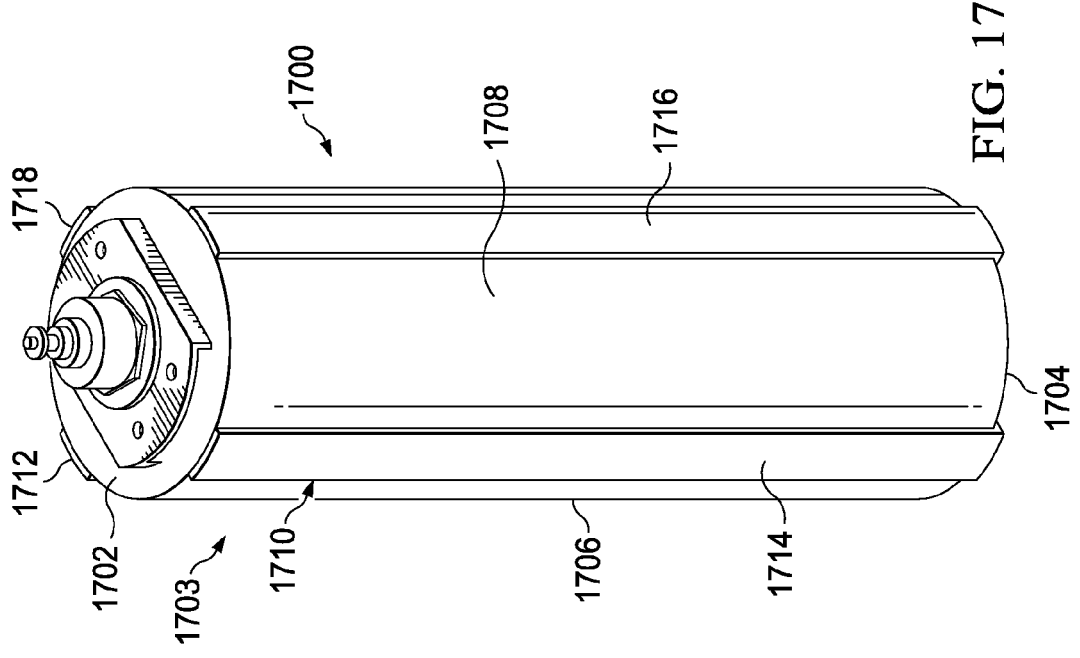

BATTERY CELL ISOLATION SYSTEM

This application is a division of prior application Ser. No. 13/033,201, filed on Feb. 23, 2011, now U.S. Pat. No. 8,916,282, the entirety of which is incorporated by reference herein.

BACKGROUND INFORMATION

1. Field

The present disclosure relates generally to battery systems and, in particular, to battery systems with multiple battery cells. Still more particularly, the present disclosure relates to a battery system in which battery cells are removably bonded to the housing of the battery.

2. Background

In the aerospace industry, batteries are used for a number of different purposes. For example, batteries may be used as backup in case a primary power generator fails to operate as desired. In other examples, batteries are used to provide power when more power is needed than can be generated by the primary power generator.

For example, spacecraft often carry onboard power generation systems that include power generators and batteries. These spacecraft may include, for example, satellites. A satellite orbiting the earth may use a power generator in the form of solar cells. The solar cells generate power from exposure to sunlight. This power is used by various devices in the satellite. These devices may include, for example, communications systems, switches, computers, and other suitable types of devices.

The satellite, however, may not always have sufficient sunlight exposure to generate the amount of power needed by the satellite. Batteries are used in the satellite to supply power in these situations. When sufficient sunlight is present, the solar cells are used to recharge the battery, as well as provide power to other devices on the satellite.

Typically, a battery is comprised of battery cells. Each battery cell generates electricity and provides power to different devices in the satellite. These battery cells are arranged in series or parallel to form the battery.

A battery for use in a spacecraft is designed to provide proper support for the battery cells. This support is designed to support the battery cells during loadings and/or vibrations that may be encountered. These loadings and/or vibrations may be encountered during testing, transportation, and/or launching of the spacecraft. The loadings also may occur from internal pressures from within the battery cells during operation of the battery.

Additionally, heat is another consideration taken into account when designing a battery. When a battery is used, chemical reactions occur to generate the electricity to provide power to the different devices. Chemical reactions also occur during recharging of the batteries.

These chemical reactions result in a production of heat. As a result, a battery is designed such that the heat produced does not reduce the ability of the battery to generate power.

For example, a battery may be designed such that heat generated by the battery cells is conducted away to a heat sink. The conduction of heat reduces the heating of the battery cells above desired temperatures. These temperatures are selected as ones that avoid reducing the life of the battery cells in the battery.

In designing batteries for use in spacecraft, such as satellites, weight and complexity are examples of other design considerations. Reducing the weight of the satellite is an important design consideration. For example, weight limitations are often present based on the launch vehicle that may be used to place the satellite into orbit. If the satellite weighs too much, a more expensive launch vehicle may be needed. In some cases, the weight of the satellite may increase the difficulty in placing the satellite into orbit.

In many conventional systems, replacing battery cells may require disassembly of the entire battery. The different rods may be disassembled, the battery cells replaced, and the rods reassembled. The rods used to bind the battery cells together are large in number and require time to secure to each other to secure the battery cells. This type of design for the battery increases the amount of time needed to rework a battery. Furthermore, the rods may lose pre-load binding strength to hold the battery cells together. This loss may occur from thermal cycling, creep, and/or vibration. As a result, over time, the battery cells may not be held together as tightly as desired.

Therefore, it would be advantageous to have a method and apparatus which takes into account one or more of the issues discussed above, as well as other possible issues.

SUMMARY

In one advantageous embodiment, a channelized, edge fitting apparatus comprises a number of battery cells, a housing, an assembly, and a number of grooves. The housing has a plurality of channels configured to provide electrical isolation between the number of battery cells. The assembly is configured to separate and electrically insulate the number of battery cells from the housing. The number of grooves is configured to accept a controlled amount of adhesive. The number of grooves is formed by the assembly and surfaces of the number of battery cells.

In another advantageous embodiment, a method is provided for installation of a battery cell. The battery cell and a number of members are positioned relative to each other to form a battery cell assembly. A number of grooves is formed by the number of members and a surface of the battery cell. The battery cell assembly is placed into a channel in a housing. The number of members physically separates the battery cell from the housing, and an adhesive in the number of grooves connects the battery assembly to the housing.

In yet another advantageous embodiment, a method is provided for replacing a battery cell. At least a portion of an assembly configured to separate the battery cell from a housing for the battery cell is removed. The assembly is configured to electrically insulate the battery cell from walls in a channel of the housing. An adhesive is separated from the channel in a plurality of channels. The battery cell is removed from the channel.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIGS. 3A and 3B are illustrations of a power generation system in accordance with an advantageous embodiment;

FIG. 17 is an illustration of a battery cell associated with an assembly in accordance with an advantageous embodiment;

FIG. 18 is an illustration of a battery cell associated with an assembly in accordance with an advantageous embodiment;

DETAILED DESCRIPTION

Figure 1:
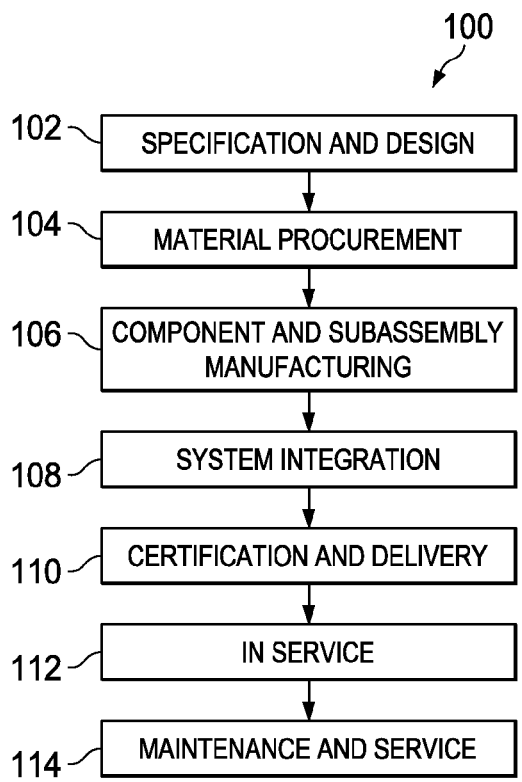
FIG. 1 is an illustration of a spacecraft manufacturing and service method in accordance with an advantageous embodiment.
Figure 2:
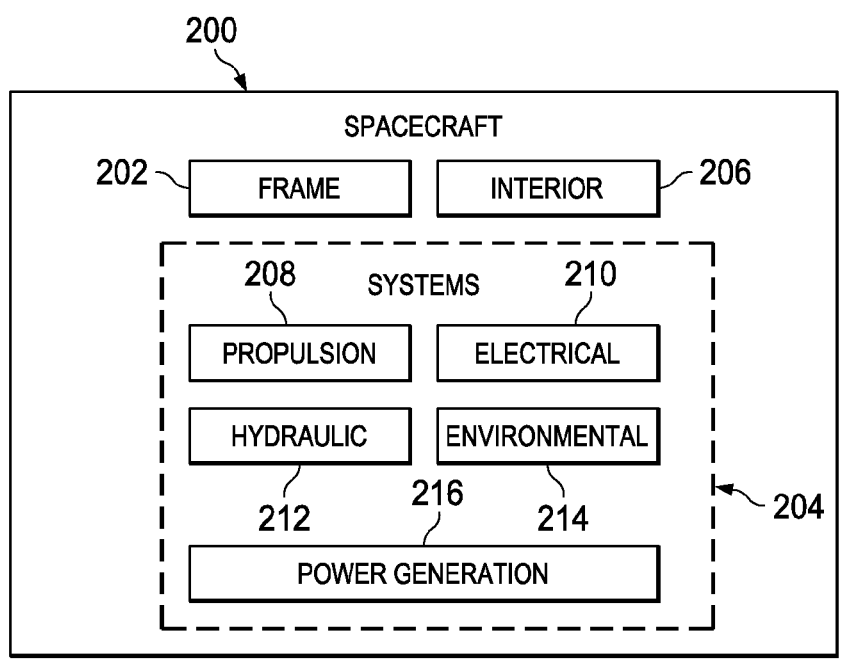
FIG. 2 is an illustration of a spacecraft in which an advantageous embodiment may be implemented.

Referring more particularly to the drawings, embodiments of the disclosure may be described in the context of spacecraft manufacturing and service method 100 as shown in FIG. 1 and spacecraft 200 as shown in FIG. 2. Turning first to FIG. 1, an illustration of a spacecraft manufacturing and service method is depicted in accordance with an advantageous embodiment. During pre-production, exemplary spacecraft manufacturing and service method 100 may include specification and design 102 of spacecraft 200 in FIG. 2 and material procurement 104.

During production, component and subassembly manufacturing 106 and system integration 108 of spacecraft 200 in FIG. 2 takes place. Thereafter, spacecraft 200 in FIG. 2 may go through certification and delivery 110 in order to be placed in service 112. While in service 112 by a customer, spacecraft 200 in FIG. 2 may be scheduled for routine maintenance and service 114, which may include modification, reconfiguration, refurbishment, and other maintenance or service.

Each of the processes of spacecraft manufacturing and service method 100 may be performed or carried out by a system integrator, a third party, and/or an operator. In these examples, the operator may be a customer. For the purposes of this description, a system integrator may include, without limitation, any number of spacecraft manufacturers and major-system subcontractors; a third party may include, without limitation, any number of venders, subcontractors, and suppliers; and an operator may be a company, a military entity, a service organization, and so on.

With reference now to FIG. 2, an illustration of a spacecraft is depicted in which an advantageous embodiment may be implemented. In this illustrative example, spacecraft 200 is produced by spacecraft manufacturing and service method 100 in FIG. 1. Spacecraft 200 may include frame 202 with a plurality of systems 204 and interior 206.

Examples of plurality of systems 204 include one or more of propulsion system 208, electrical system 210, hydraulic system 212, environmental system 214, and power generation system 216. Although an aerospace example is shown, different advantageous embodiments may be applied to other industries, such as the automotive industry.

Apparatus and methods embodied herein may be employed during at least one of the stages of spacecraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while spacecraft 200 is in service 112 in FIG. 1.

As yet another example, a number of apparatus embodiments, method embodiments, or a combination thereof may be utilized during production stages, such as component and subassembly manufacturing 106 and system integration 108 in FIG. 1. A number, when referring to items, means one or more items. For example, a number of apparatus embodiments is one or more apparatus embodiments. A number of apparatus embodiments, method embodiments, or a combination thereof may be utilized while spacecraft 200 is in service 112 and/or during maintenance and service 114 in FIG. 1. The use of a number of the different advantageous embodiments may substantially expedite the assembly and/or reduce the cost of spacecraft 200.

The different advantageous embodiments recognize and take into account a number of different considerations.

In these illustrative examples, the different advantageous embodiments recognize and take into account that the designs of batteries used in spacecraft may be complex. For example, with rectangular battery cells, rods or other structural components are used to form the battery. In other words, the rods are placed around the battery cells. The rods are then secured to each other or to other components to form the battery. The assembly of battery cells with the rods is placed into a housing to form the battery.

The different advantageous embodiments recognize that during testing, reworking of a battery may be needed. For example, one or more battery cells may not perform within desired limits. As a result, the battery may be reworked by replacing those battery cells.

Currently, replacing battery cells may require disassembly of the entire battery. The different rods may be disassembled, the battery cells replaced, and the rods reassembled. The rods used to bind the battery cells together are large in number and require time to secure to each other to secure the battery cells. This type of design for the battery increases the amount of time needed to rework a battery.

Also, the different advantageous embodiments recognize and take into account that these rods may lose pre-load used to hold the battery cells together. This loss may occur from thermal cycling, creep, and/or vibration. As a result, over time, the battery cells may not be held together as tightly as desired.

The different advantageous embodiments also recognize and take into account that current battery designs may provide for heat flow from the battery cells through the housing to a cooling system. For example, heat sinks may be present within the housing to increase the transfer of heat from the batteries to the housing. Materials for the housing are selected as ones that have a rate of conductivity for heat that allows for a desired amount of heat to flow through the housing to a cooling system. Additionally, other materials or heat sinks may be attached to the exterior of the housing to increase the transfer of heat from the housing to a cooling system. These different types of systems increase the number of components, weight, and cost of a battery used in the spacecraft.

The different advantageous embodiments also recognize and take into account that currently, battery cells may be wrapped in a tape that has adhesive properties. For example, a polyimide tape may be used to wrap the battery cells. This tape may provide insulation. The different advantageous embodiments also recognize and take into account that the amount of load that may be supported by a battery may be limited by the strength of the adhesive for the tape.

Thus, the different advantageous embodiments provide a number of battery cells, a housing, and an assembly. The housing is configured to hold the number of battery cells. The assembly is configured to separate a battery cell in the number of battery cells from the housing. The assembly is configured to electrically insulate the number of battery cells from the housing and has a plurality of channels. A number of grooves is formed by the assembly and a surface of the battery cell.

Figure 3B:
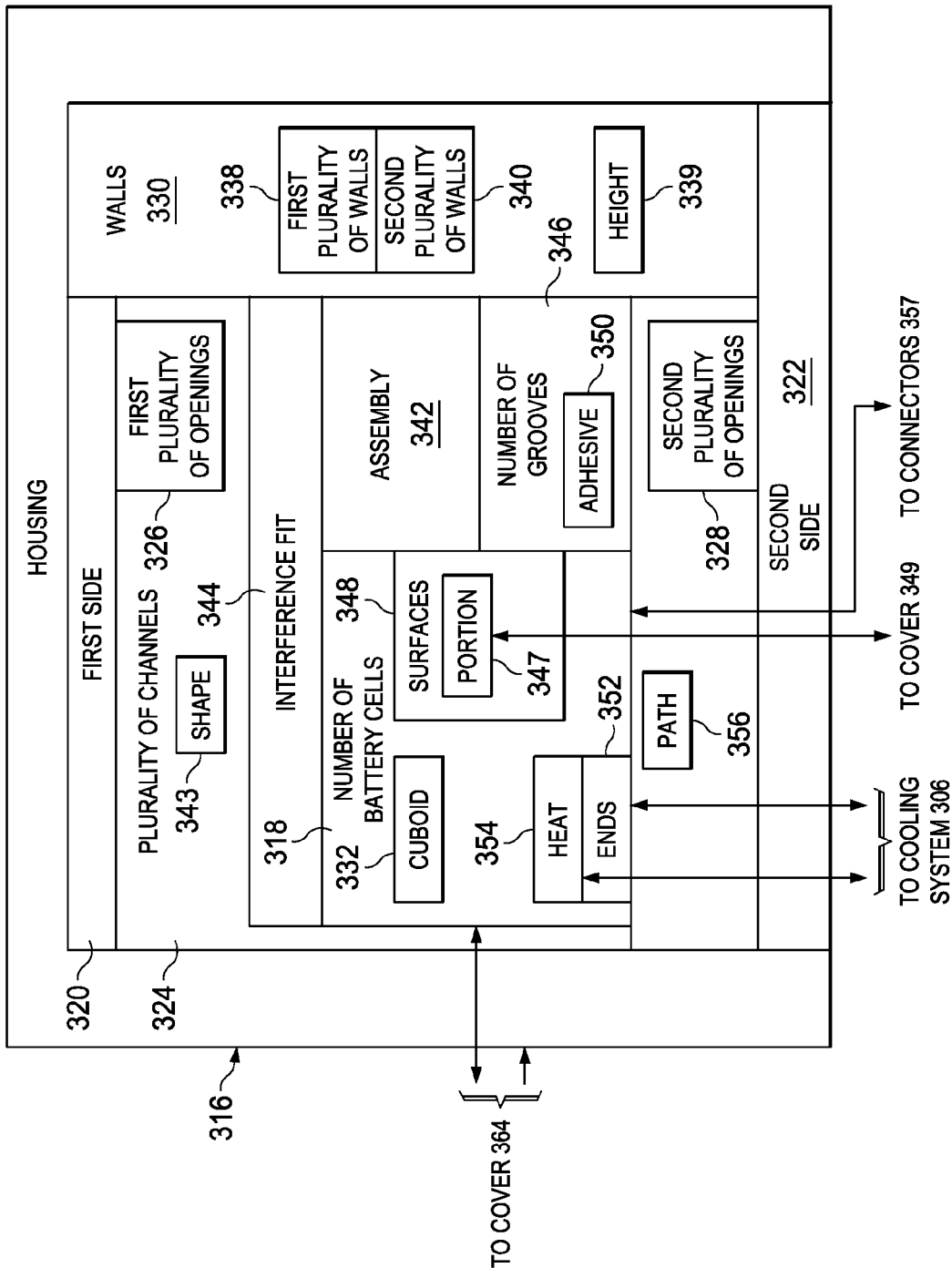

With reference now to FIGS. 3A and 3B, an illustration of a power generation system is depicted in accordance with an advantageous embodiment. In FIG. 3A, power generation system 300 is an example of one implementation for power generation system 216 in spacecraft 200 in FIG. 2.

As depicted, power generation system 300 includes power generator 302 and battery system 304. Power generator 302 and battery system 304 provide power 308 to loads 310. In these illustrative examples, power 308 takes the form of electrical power.

As depicted, power generator 302 may take a number of different forms. For example, without limitation, power generator 302 may include at least one of solar cells, a nuclear power unit, and other suitable types of power generation devices.

Battery system 304 comprises number of batteries 312. These batteries provide power 308 when power generator 302 is unable to provide power 308 or the amount of power 308 needed by loads 310. Loads 310 may comprise a number of different types of devices. For example, without limitation, loads 310 may include at least one of a computer, an inertial measurement unit, a sensor, an actuator system, a radiation measurement device, and/or some other suitable type of device that uses power 308.

In these illustrative examples, battery 314 within number of batteries 312 comprises housing 316. Housing 316 may also be referred to as a chassis or a battery chassis. As depicted in FIG. 3B, housing 316 is formed as a single component. Further, housing 316 is configured to house number of battery cells 318 for number of batteries 312. Housing 316 has first side 320 and second side 322.

Plurality of channels 324 extends through housing 316 between first side 320 and second side 322. In particular, plurality of channels 324 has first plurality of openings 326 on first side 320 and second plurality of openings 328 on second side 322. In other words, each of plurality of channels 324 has an opening on either side of housing 316. Plurality of channels 324 is configured to receive and hold number of battery cells 318. In some cases, number of battery cells 318 may be less in number than plurality of channels 324. In this situation, some of plurality of channels 324 may not receive a battery cell.

In these illustrative examples, plurality of channels 324 is formed by walls 330. In one illustrative example, walls 330 comprise first plurality of walls 338 and second plurality of walls 340. First plurality of walls 338 and second plurality of walls 340 are substantially orthogonal to each other in these illustrative examples. In other words, first plurality of walls 338 meets second plurality of walls 340 at substantially right angles.

In this illustrative example, number of battery cells 318 has a shape in the form of cuboid 332. Plurality of channels 324 has shape 343 that is configured to receive cuboid 332 of number of battery cells 318. Cuboid 332 has rectangular cross sections in these illustrative examples. Cuboid 332 also may be referred to as a right rectangular prism.

In these illustrative examples, walls 330 have height 339. Height 339 of walls 330 is such that at least a portion of number of battery cells 318 fits within plurality of channels 324. Height 339 may be such that part or all of each battery in number of battery cells 318 fits within plurality of channels 324.

Number of battery cells 318 is associated with assembly 342. Assembly 342 may include members associated with number of battery cells 318 in a number of different ways. For example, assembly 342 may be positioned relative to number of battery cells 318. After being positioned in this manner, assembly 342 may be bonded to number of battery cells 318. However, assembly 342 may be bonded to number of battery cells 318 loosely enough so that assembly 342 may be separated from number of battery cells 318 at a future point in time.

In other depicted examples, assembly 342 may not be bonded to number of battery cells 318 prior to installing number of battery cells 318 in housing 316. For example, in some cases, assembly 342 may first be placed into plurality of channels 324 with number of battery cells 318, then placed into plurality of channels 324 and associated with number of battery cells 318.

In this manner, number of battery cells 318 and assembly 342 are placed into plurality of channels 324. As depicted, assembly 342 is associated with number of battery cells 318 such that assembly 342 physically separates number of battery cells 318 from housing 316. In these examples, assembly 342 is configured to electrically insulate number of battery cells 318 from housing 316. In other words, the physical separation of number of battery cells 318 from housing 316 by assembly 342 allows assembly 342 to electrically insulate number of battery cells 318 from housing 316.

Further, assembly 342 may be configured to secure number of battery cells 318 to walls 330 for plurality of channels 324. For example, assembly 342, in association with number of battery cells 318, may provide interference fit 344. Interference fit 344 secures number of battery cells 318 within plurality of channels 324 through friction between assembly 342 and walls 330 forming plurality of channels 324, and between assembly 342 and number of battery cells 318. The friction may be caused by compression of assembly 342 and number of battery cells 318 against walls 330.

As another example, number of grooves 346 is present in these examples. Number of grooves 346 is formed by assembly 342 and surfaces 348 of number of battery cells 318. In some illustrative examples, adhesive 350 may be located in number of grooves 346. Adhesive 350 is configured to connect number of battery cells 318 to housing 316. In particular, adhesive 350 may connect at least one of assembly 342 and surfaces 348 of number of battery cells 318 to walls 330 of housing 316. Further, adhesive 350 also provides additional electrical insulation between number of battery cells 318 and housing 316.

In some cases, adhesive 350 may connect at least one of assembly 342 and portion 347 of surfaces 348 of number of battery cells 318 to cover 349. In these illustrative examples, cover 349 may be connected to second side 322. Cover 349 also may be removable to allow individual battery cells in number of battery cells 318 to be removed through channels in plurality of channels 324 for replacement. For example, with cover 349 removed, a battery cell may be pushed through a channel and removed to be replaced by another battery cell.

Further, adhesive 350 may be applied to cover 349 through plurality of channels 324 prior to installing number of battery cells 318 in the channels to allow number of battery cells 318 to bond to cover 349.

In some illustrative examples, adhesive 350 may not be needed to bond number of battery cells 318 to cover 349. In other illustrative examples, cover 349 may not be used with battery system 304.

Adhesive 350 may take a number of different forms. For example, without limitation, adhesive 350 may be a room temperature-vulcanizing (RTV) silicone, a thermal plastic material, polyvinyl acetate, an epoxy material, polyurethane, a cyanoacrylate polymer, and/or some other suitable type of adhesive.

In these illustrative examples, ends 352 of number of battery cells 318 may be thermally connected to cooling system 306. In other words, ends 352 may be connected to cooling system 306 in a manner that allows for heat 354 to flow from number of battery cells 318 to cooling system 306. For example, ends 352 may be in contact with cooling system 306 such that heat 354 from number of battery cells 318 can travel to cooling system 306. When cover 349 is present, ends 352 may be in contact with cover 349, which may be in contact with cooling system 306. The use of cover 349 and/or adhesive 350 for bonding number of battery cells 318 to cover 349 depends on the amount of loading that needs to be supported by adhesive 350. This loading may be, for example, shear loads that may be applied to separate number of battery cells 318 from housing 316.

In these examples, heat 354 has path 356 that flows directly from number of battery cells 318 to cooling system 306. Ends 352 of number of battery cells 318 may be in direct contact with cooling system 306. In these examples, direct contact means that no intermediate devices or components are present between ends 352 and cooling system 306.

In some illustrative examples, cooling system 306 may include a thermal gasket, a conductive lubricant, and/or some other thermal conductive material to provide an increased heat transfer between ends 352 and cooling system 306.

Cooling system 306 may take the form of plate 358. Battery 314 may sit on plate 358 such that ends 352 of number of battery cells 318 are in contact with plate 358.

In these illustrative examples, housing 316 may be secured to plate 358 with fasteners 360. Plate 358 may serve as a shelf or platform for battery 314, as well as other components within loads 310. Plate 358 may contain various cooling mechanisms. For example, plate 358 may act as a heat sink. Plate 358 may include, for example, without limitation, channels with cooling fluids, gasses, and other suitable types of mechanisms.

In these illustrative examples, walls 330 may be comprised of various types of materials. For example, without limitation, walls 330 may be comprised of a material selected from an electrically conductive material, an electrically insulating material, a heat conducting material, a heat insulating material, metal, ceramic, fiberglass, a composite material, aluminum, steel, and other suitable types of materials.

In these examples, housing 316 is a single-piece housing. The use of assembly 342 within plurality of channels 324 reduces the number of components for battery 314 within number of batteries 312. With housing 316, reworking of battery 314 may be reduced in complexity when adhesive 350 is used.

For example, adhesive 350 may be removed from a channel within plurality of channels 324 to remove and/or cut a battery cell from number of battery cells 318 and the portion of assembly 342 for the battery replacement. In this manner, disassembly of other components within battery 314 may be avoided.

Further, in these illustrative examples, walls 330 may be made as thin as needed to hold number of battery cells 318 in place. Walls 330 may be selected as having a thickness and/or strength sufficient to hold number of battery cells 318.

As one illustrative example, walls 330 may be supported by number of battery cells 318. This support may allow for a reduction in the thickness of walls 330. Further, with this type of architecture for housing 316, pre-loading or tension does not need to be placed upon various components, such as number of battery cells 318, to assemble battery 314. As a result, reducing the thickness of walls 330 may reduce the weight of battery 314.

Further, number of battery cells 318 is connected to each other in series and/or parallel. These connections may be made using connectors 357. Connectors 357 may be, for example, without limitation, wires, cables, and/or other suitable types of connectors that provide electrical connections. Number of battery cells 318 may also be connected to terminals 359. Terminals 359 may include positive terminal 361 and negative terminal 362 in these examples. Terminals 359 may be associated with cover 364. Cover 364 may be secured or attached to housing 316.

The illustrations of power generation system 300 in FIG. 3A and housing 316 in FIG. 3B are not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some illustrative examples, number of battery cells 318 may be cylindrical in shape. The cylindrical shape may be, for example, an elliptic cylinder, a circular cylinder, or some other type of cylindrical shape. Additionally, number of battery cells 318 may have the shape of a cone, a frustum, a pyramid, or some other suitable shape. As a result, plurality of channels 324 may be circular, rather than cuboid in form. Of course, other shapes may be used, depending on the particular implementation. Additionally, in some advantageous embodiments, different cells in number of battery cells 318 may have different shapes, rather than all cells having the same shape.

Figure 4:
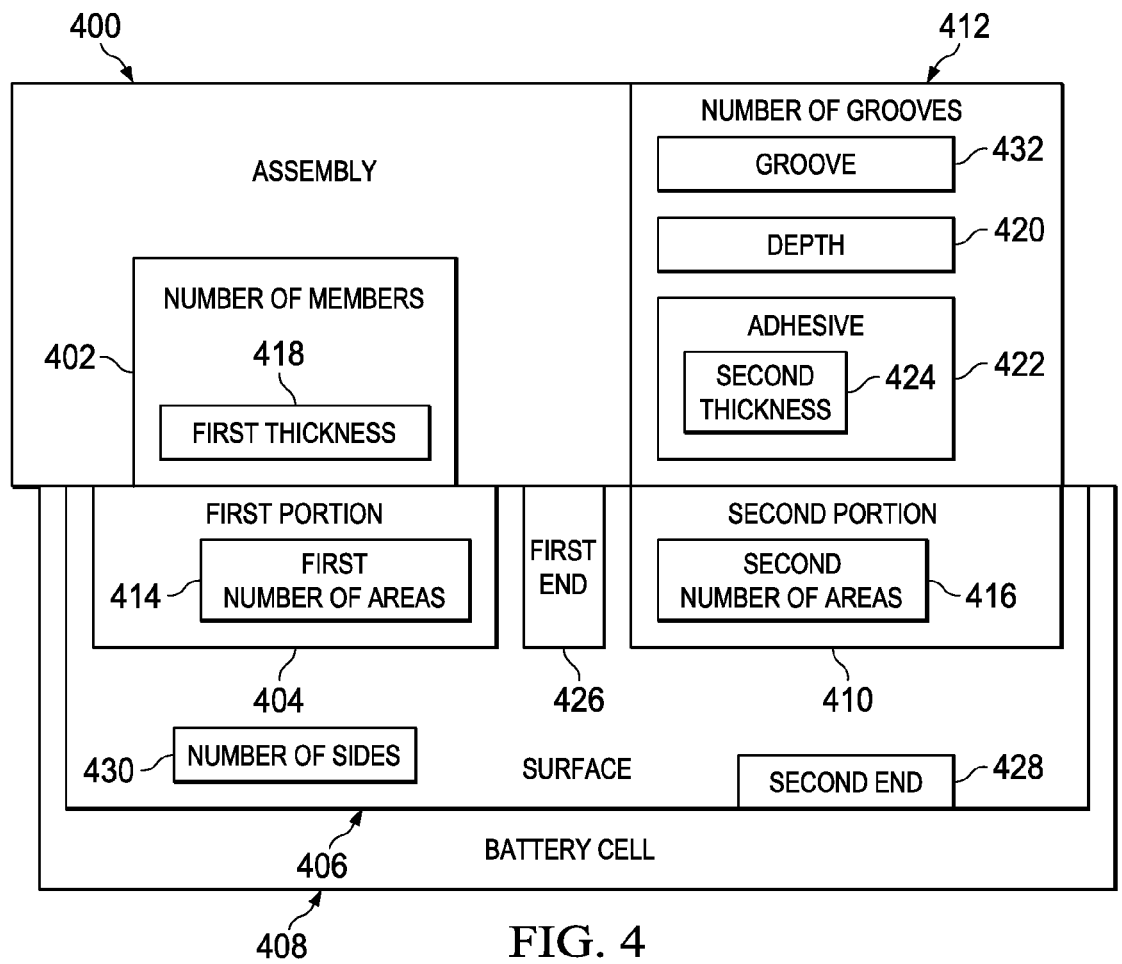
FIG. 4 is an illustration of an assembly with a battery in accordance with an advantageous embodiment.

With reference now to FIG. 4, an illustration of an assembly with a battery is depicted in accordance with an advantageous embodiment. In this illustrative example, assembly 400 is an example of one implementation of assembly 342 in FIG. 3B. In this illustrative example, assembly 400 comprises number of members 402.

In this illustrative example, number of members 402 may cover first portion 404 of surface 406 of battery cell 408. First portion 404 may include the edges and/or corners of battery cell 408. Number of members 402 may also be referred to as edge fittings. Battery cell 408 may be a battery cell within number of battery cells 318 in FIG. 3B.

In this illustrative example, second portion 410 of surface 406 of battery cell 408 is not covered by number of members 402. In other words, second portion 410 of surface 406 is exposed in these illustrative examples. Number of grooves 412 is formed by number of members 402 and second portion 410 of surface 406 of battery cell 408.

In this example, first portion 404 of surface 406 may not be contiguous. In other words, first portion 404 may have first number of areas 414 in which each area in first number of areas 414 may correspond to a member in number of members 402. In a similar fashion, surface 406 in second portion 410 also may not be contiguous. For example, surface 406 and second portion 410 may have second number of areas 416. Each area in second number of areas 416 may correspond to a groove in number of grooves 412 in these depicted examples.

In these illustrative examples, number of members 402 has first thickness 418. Number of grooves 412 may have depth 420 that has a value substantially equal to first thickness 418. When adhesive 422 is present in number of grooves 412, adhesive 422 may have second thickness 424. Second thickness 424 is substantially equal to first thickness 418 in these depicted examples.

Additionally, different portions of number of members 402 may have different thicknesses. For example, the portions of number of members 402 configured to contact number of sides 430 of battery cell 408 may have a thickness, while the portions of number of members 402 configured to contact second end 428 of battery cell 408 may have a different thickness. In this manner, the thickness of adhesive 422 in number of grooves 412 formed by number of members 402 may also vary.

As one illustrative example, the thickness of the different portions of number of members 402 may be selected such that adhesive 422 present at second end 428 of battery cell 408 has a greater thickness than adhesive 422 present at number of sides 430 of battery cell 408. Adhesive 422 at second end 428 of battery cell 408 provides a path for allowing heat generated in battery cell 408 to be removed.

In these illustrative examples, battery cell 408 has first end 426, second end 428, and number of sides 430. First end 426 is configured to be placed into a channel within plurality of channels 324 in FIG. 3B. First end 426 is opposite of second end 428 in these examples. Number of sides 430 form the sides of battery cell 408. When battery cell 408 has a cylindrical shape, number of sides 430 is one side. If battery cell 408 takes the form of a cuboid, number of sides 430 has four sides. In these illustrative examples, number of grooves 412 may be present on number of sides 430 and first end 426. For example, groove 432 in number of grooves 412 may be present in first end 426. As a result, adhesive 422 at first end 426 may have second thickness 424.

The illustration of assembly 400 in FIG. 4 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, number of members 402 is depicted having first thickness 418. In some illustrative examples, number of members 402 may have different thicknesses around different parts of battery cell 408. For example, number of members 402 may have one thickness on number of sides 430 and another thickness at first end 426. In this manner, different thicknesses of adhesive 422 may be present in different portions, depending on the particular implementation.

As yet another example, although assembly 400 is depicted as being used with battery cell 408, assembly 400 may be used with additional battery cells in addition to battery cell 408. For example, assembly 400 may be configured such that additional numbers of members may be used with other battery cells in number of battery cells 318 in FIG. 3. Assembly 400 may have different numbers of members, depending on the number of battery cells that are to be used with assembly 400. In some illustrative examples, only a portion of number of battery cells 318 in FIG. 3B may be used with assembly 400.

Figure 5:
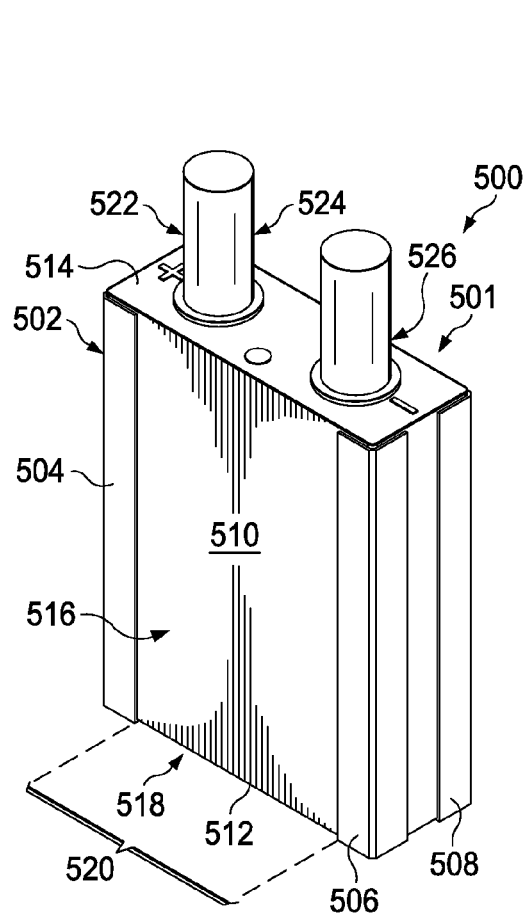
FIG. 5 is an illustration of an isometric view of a battery cell associated with an assembly in accordance with an advantageous embodiment.

Turning now to FIG. 5, an illustration of an isometric view of a battery cell associated with an assembly is depicted in accordance with an advantageous embodiment. In this illustrative example, a battery cell-edge fitting approach is disclosed. Referring again to FIG. 5, the battery cell-edge fitting approach includes members, such as members 504, 506, and 508, groove 518, and a controlled amount of adhesive.

A controlled amount of adhesive may be the amount, thickness, and/or some other suitable parameter for the adhesive used with a battery cell being controlled. For example, without limitation, adhesive 1200 in FIG. 12 may have different thicknesses on different surfaces of battery cell 500. In this advantageous embodiment, battery cell 500 is an example of a battery cell in number of battery cells 318 in FIG. 3B and battery cell 408 in FIG. 4. Battery cell 500 has cuboid shape 501 in this illustrative example.

As depicted, battery cell 500 is associated with assembly 502. Assembly 502 comprises member 504, member 506, member 508, and another member (not shown in this view). Of course, assembly 502 may also include other members that may be associated with other battery cells. In particular, these members are positioned relative to the corners of battery cell 500 such that the members contact surface 510 of battery cell 500 and cover a portion of surface 510. The portion of surface 510 not covered by a member in assembly 502 is exposed.

Battery cell 500 has first end 512, second end 514, and number of sides 516. First end 512 is configured to be placed into a channel, such as a channel in plurality of channels 324 in FIG. 3B. Grooves 518 are formed at first end 512 of battery cell 500 by surface 510 and member 504, member 506, member 508, and the additional member. As one illustrative example, groove 520 is formed at first end 512 of battery cell 500 by member 504, member 506, and the portion of surface 510 exposed between member 504 and member 506. In this illustrative example, the four members in assembly 502 extend past first end 512 of battery cell 500 in this example.

Additionally, battery cell 500 is connected to terminals 522. Terminals 522 include positive terminal 524 and negative terminal 526.

Figure 6:
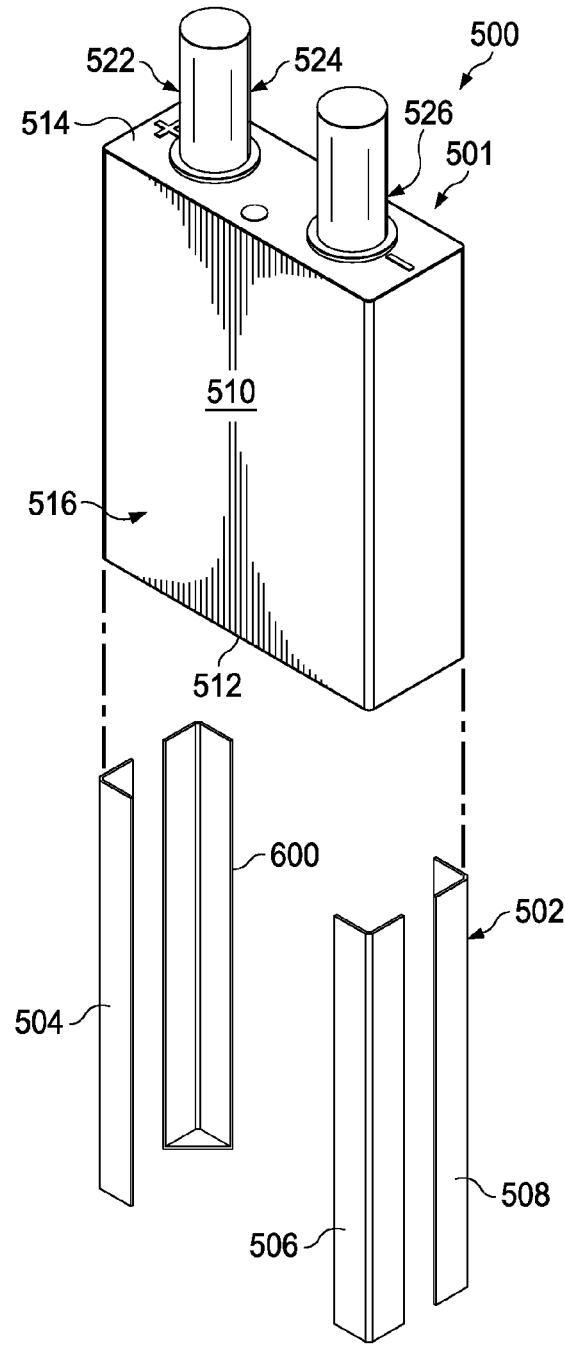
FIG. 6 is an illustration of an exploded isometric view of a battery cell in accordance with an advantageous embodiment.

With reference now to FIG. 6, an illustration of an exploded isometric view of a battery cell is depicted in accordance with an advantageous embodiment. In this illustrative example, members 504, 506, 508, and 600 in assembly 502 are depicted separated from battery cell 500 and are not in contact with surface 510 of battery cell 500.

Figure 7:
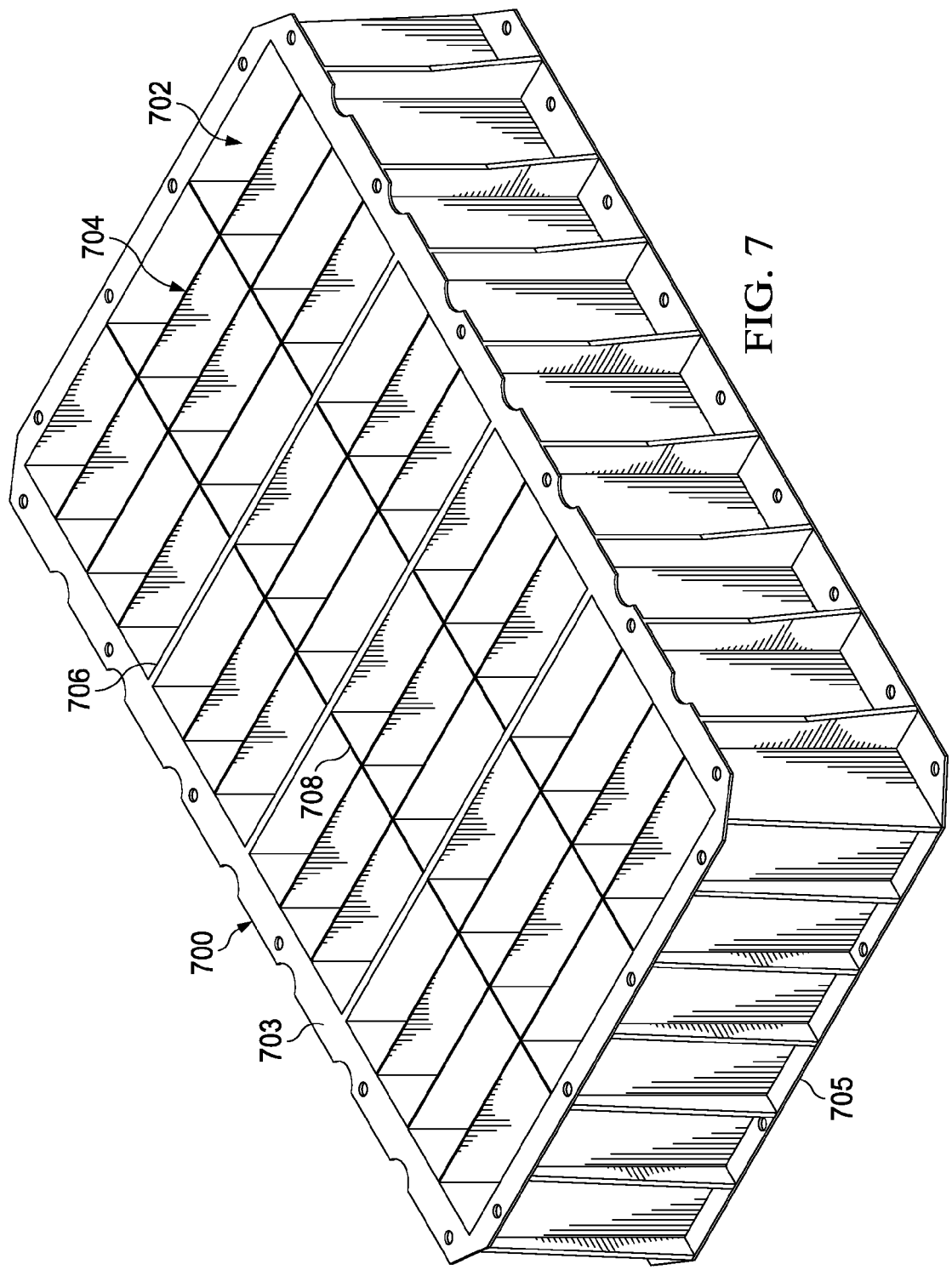
FIG. 7 is an illustration of a top isometric view of a housing for a battery system in accordance with an advantageous embodiment.

Turning now to FIG. 7, an illustration of a top isometric view of a housing for a battery system is depicted in accordance with an advantageous embodiment. Housing 700 is an example of one implementation for housing 316 for battery system 304 in FIGS. 3A and 3B.

In this illustrative example, housing 700 comprises plurality of channels 702. In this particular illustrative example, housing 700 is part of a channelized, edge fitting apparatus. Plurality of channels 702 is configured to receive battery cells, such as battery cell 500 in FIG. 5. Housing 700 has first side 703 and second side 705. Any number of battery cells may be inserted into plurality of channels 702 from first side 703 of housing 700. For example, edges formed by members 504, 506, 508, and 600 in assembly 502 for battery cell 500 in FIGS. 5 and 6 may slide or fit into a channel in plurality of channels 702.

Plurality of channels 702 are formed by walls 704. Walls 704 include first plurality of walls 706 and second plurality of walls 708. Walls 704 are arranged such that first plurality of walls 706 and second plurality of walls 708 meet at substantially right angles.

Figure 8:
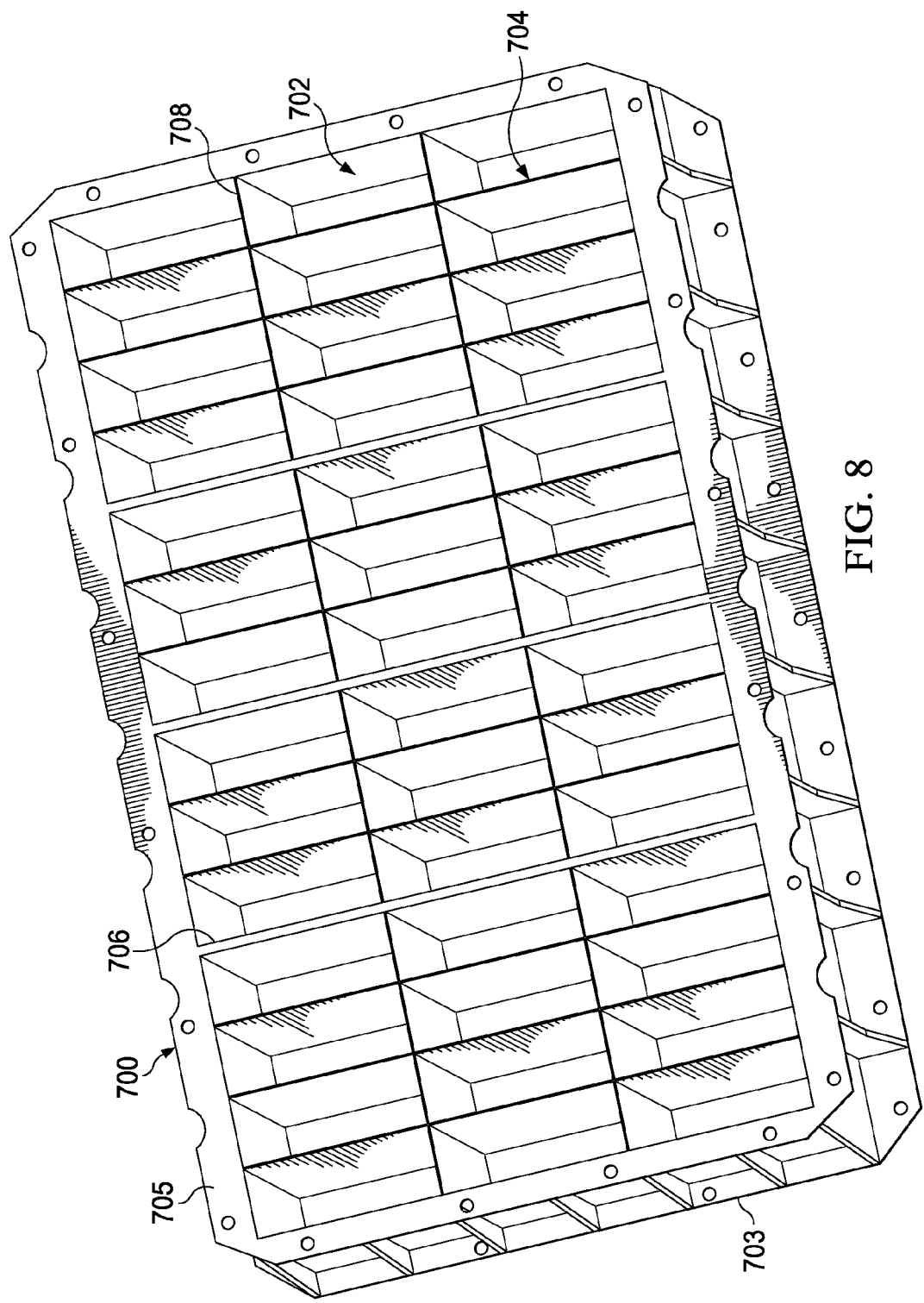
FIG. 8 is an illustration of a top isometric view of a housing in accordance with an advantageous embodiment.

In FIG. 8, an illustration of a top isometric view of housing 700 is depicted in accordance with an advantageous embodiment.

Figure 9:
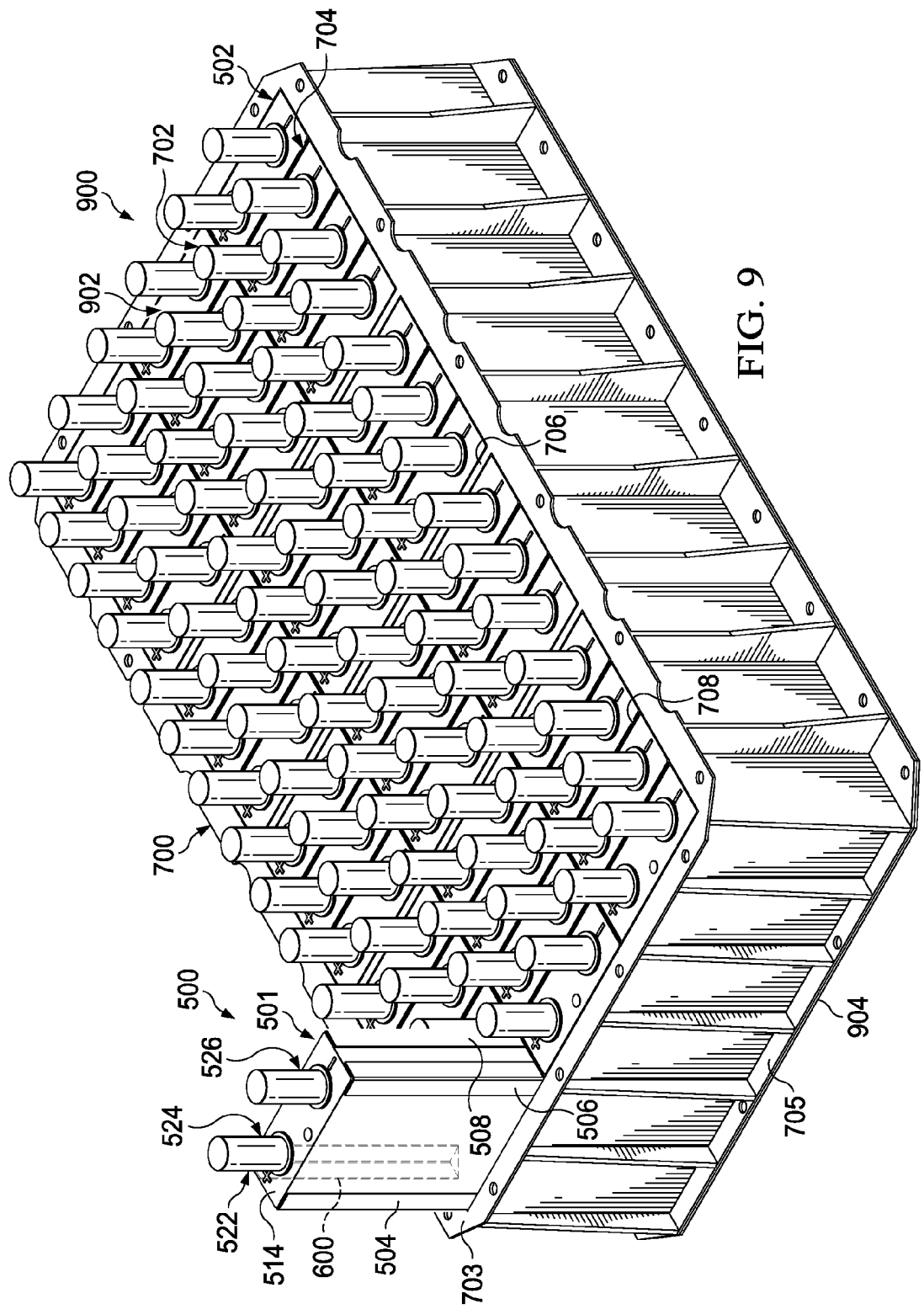
FIG. 9 is an illustration of a battery system in accordance with an advantageous embodiment.

With reference now to FIG. 9, an illustration of a battery system is depicted in accordance with an advantageous embodiment. Battery system 900 is an example of one implementation for battery system 304 in FIGS. 3A and 3B. In this illustrative example, battery system 900 includes housing 700 from FIG. 7 and battery cells 902.

Battery cells 902 include battery cell 500 from FIG. 5 and other battery cells similar to battery cell 500 in FIG. 5. As depicted, battery cells 902 are bonded to walls 704 of housing 700 inside plurality of channels 702. Further, battery cells 902 are bonded to cover 904 at second side 705 of housing 700. Cover 904 may be, for example, a substantially planar plate bonded to second side 705 of housing 700. Cover 904 is removable and may be removed when battery system 900 has been fully assembled and cured.

Figure 10:
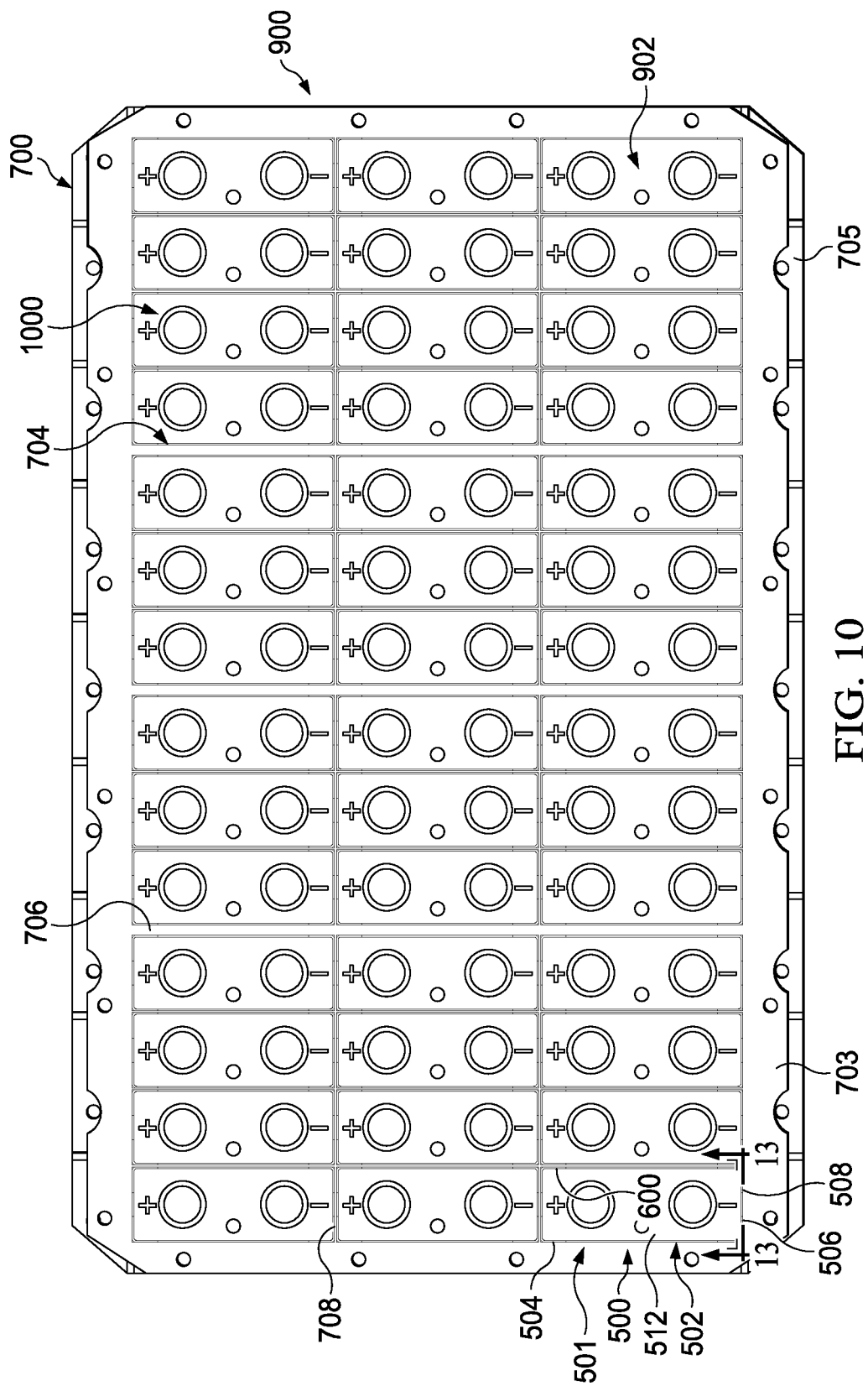
FIG. 10 is an illustration of a top view of a battery system in accordance with an advantageous embodiment.

Turning now to FIG. 10, an illustration of a top view of battery system 900 is depicted in accordance with an advantageous embodiment. In this illustrative example, terminals 1000 for battery cells 902 are clearly depicted.

Additionally, as depicted, assembly 502 includes members 1002 associated with battery cells 902. Members 1002 include members 504, 506, 508, and 600 associated with battery cell 500 and other similar members associated with the other battery cells in battery cells 902.

Figure 11:
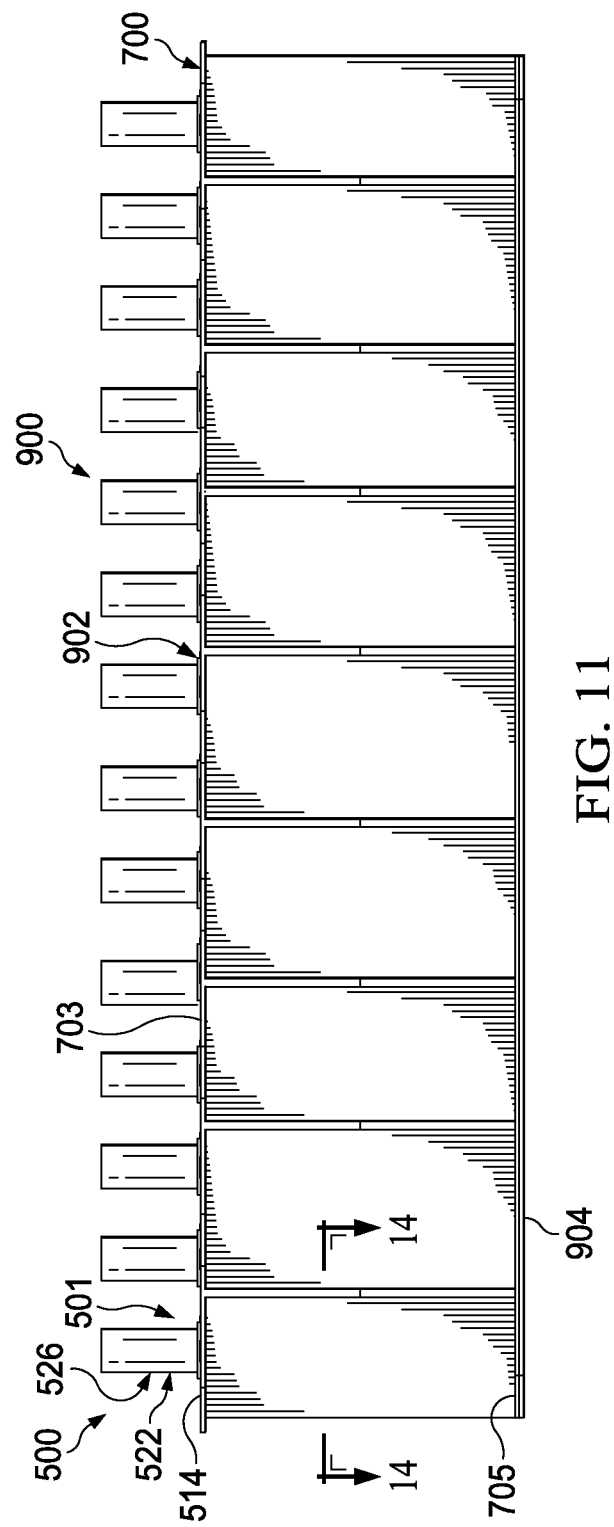
FIG. 11 is an illustration of a side view of a battery system in accordance with an advantageous embodiment.

In FIG. 11, an illustration of a side view of battery system 900 is depicted in accordance with an advantageous embodiment.

Figure 12:
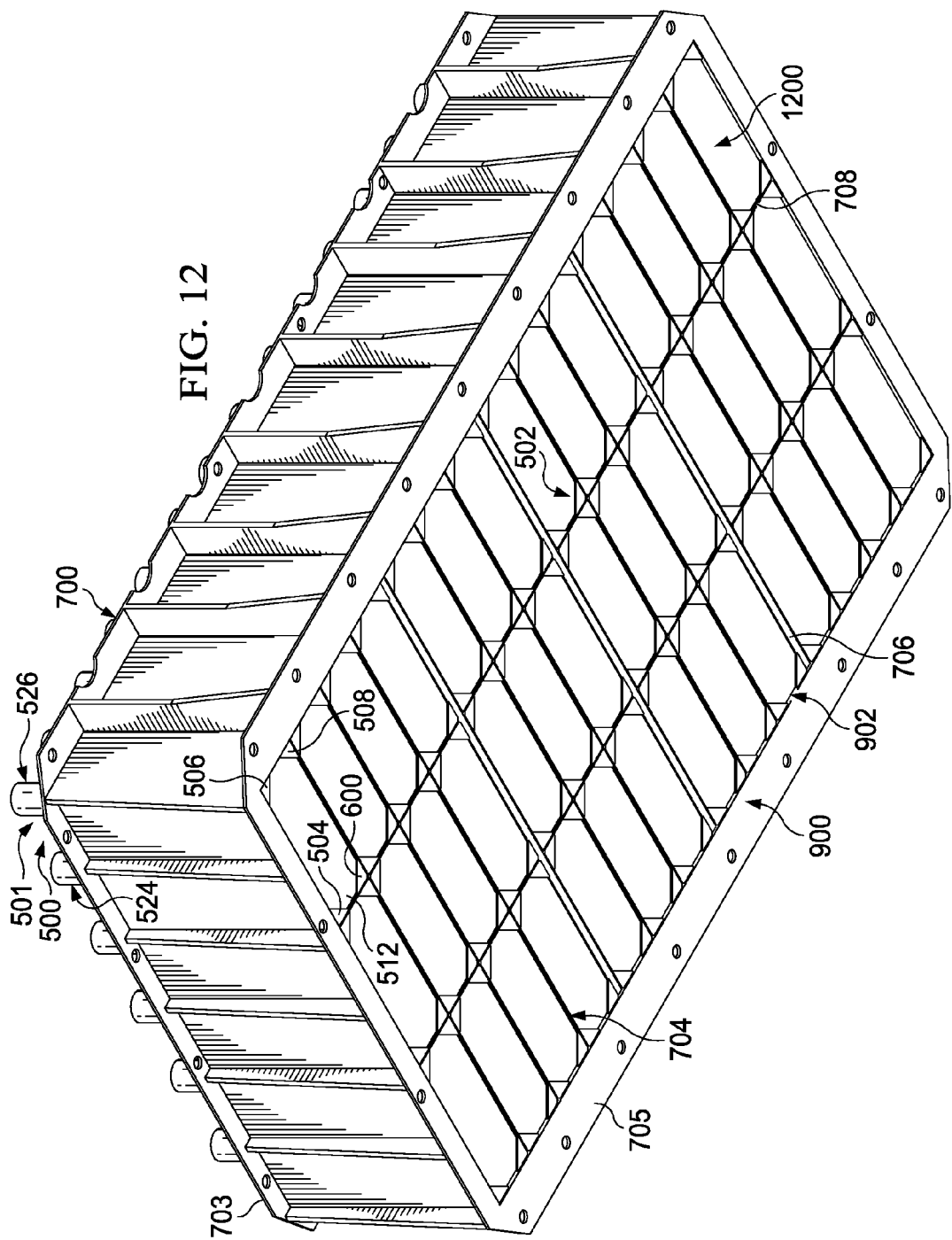
FIG. 12 is a bottom isometric view of a battery system in accordance with an advantageous embodiment.

With reference now to FIG. 12, a bottom isometric view of battery system 900 is depicted in accordance with an advantageous embodiment. In this illustrative example, cover 904 has been removed to allow adhesive 1200 at second side 705 of housing 700 to be seen. Battery cells 902 are bonded to adhesive 1200 and to housing 700 through adhesive 1200. In these depicted examples, adhesive 1200 may be, for example, without limitation, a room temperature vulcanization (RTV) silicone adhesive. Assembly 502 ensures that battery cells 902 are positioned in a desired manner in housing 700.

Figure 13:
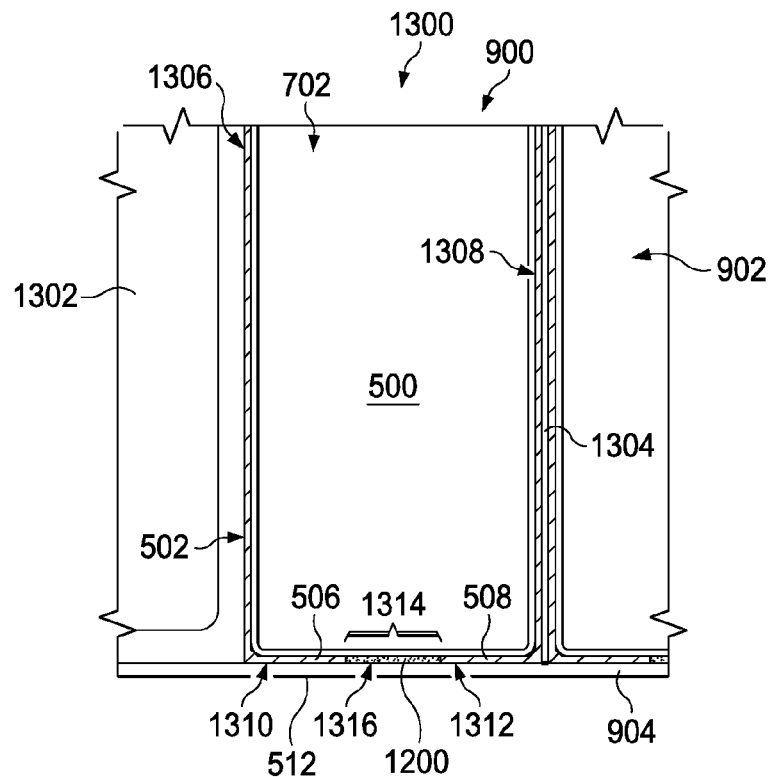
FIG. 13 is an illustration of a cross-sectional view of a battery system in accordance with an advantageous embodiment.

With reference now to FIG. 13, an illustration of a cross-sectional view of battery system 900 is depicted in accordance with an advantageous embodiment. In this illustrative example, a cross-sectional view of battery system 900 is depicted taken along lines 13-13 in FIG. 10. In particular, a cross-sectional view of channel 1300 of plurality of channels 702 is depicted.

As depicted, battery cell 500 of battery cells 902 is in channel 1300. Battery cell 500 is associated with assembly 502. Battery cell 500 is bonded to cover 904 through adhesive 1200. Further, members 506 and 508 are bonded to wall 1302 and wall 1304 forming channel 1300 through adhesive 1200.

In this illustrative example, portion 1306 of member 506 and portion 1308 of member 508 have substantially the same thickness. Similarly, portion 1310 of member 506 and portion 1312 of member 508 have substantially the same thickness. In this depicted example, the thickness of portion 1306 and portion 1308 is different than the thickness of portion 1310 and portion 1312. However, in other examples, these thicknesses may be substantially the same.

As illustrated, adhesive 1200 has thickness 1314 in groove 1316 at first end 512 of battery cell 500. Thickness 1314 is substantially the same as the thickness of portion 1310 of member 506 and portion 1312 of member 508.

Figure 14:
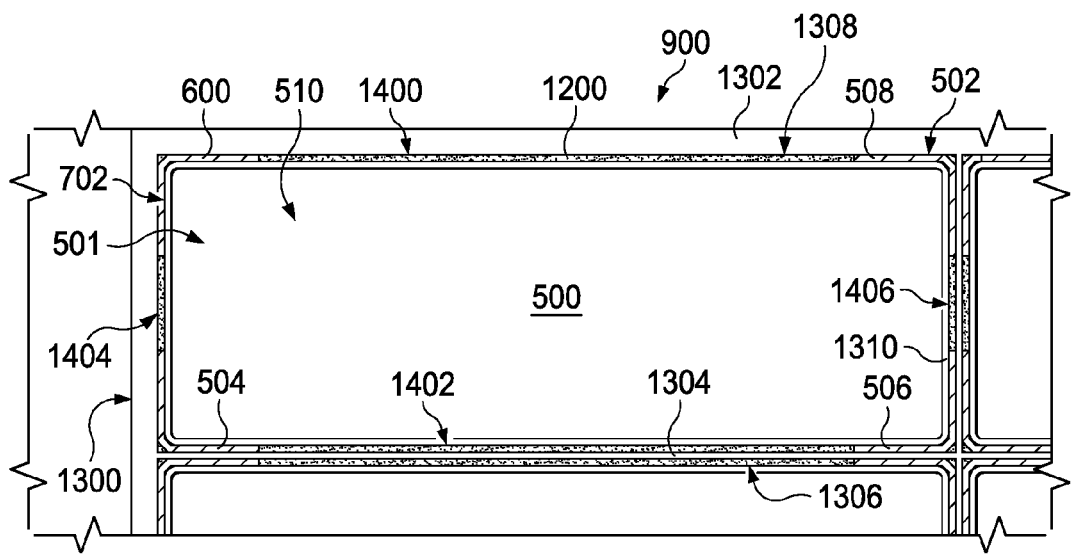
FIG. 14 is an illustration of a cross-sectional view of a battery system in accordance with an advantageous embodiment.

Turning now to FIG. 14, an illustration of a cross-sectional view of a battery system is depicted in accordance with an advantageous embodiment. In this illustrative example, a cross-sectional view of battery system 900 is depicted taken along lines 14-14 in FIG. 11.

As depicted, adhesive 1200 is in groove 1400 and groove 1402. Adhesive 1200 in groove 1400 and groove 1402 has substantially the same thickness as portion 1306 of member 506 and portion 1308 of member 508 in FIG. 13. Further, adhesive 1200 is also in groove 1404 and groove 1406. Adhesive 1200 in groove 1404 and groove 1406 has substantially the same thickness as portion 1308 of member 508 and portion 1310 of member 506. The thickness of adhesive 1200 in grooves 1400, 1402, 1404, and 1406 is set by surface 510 of battery cell 500 and the walls in walls 702 that form channel 1300.

Figure 15:
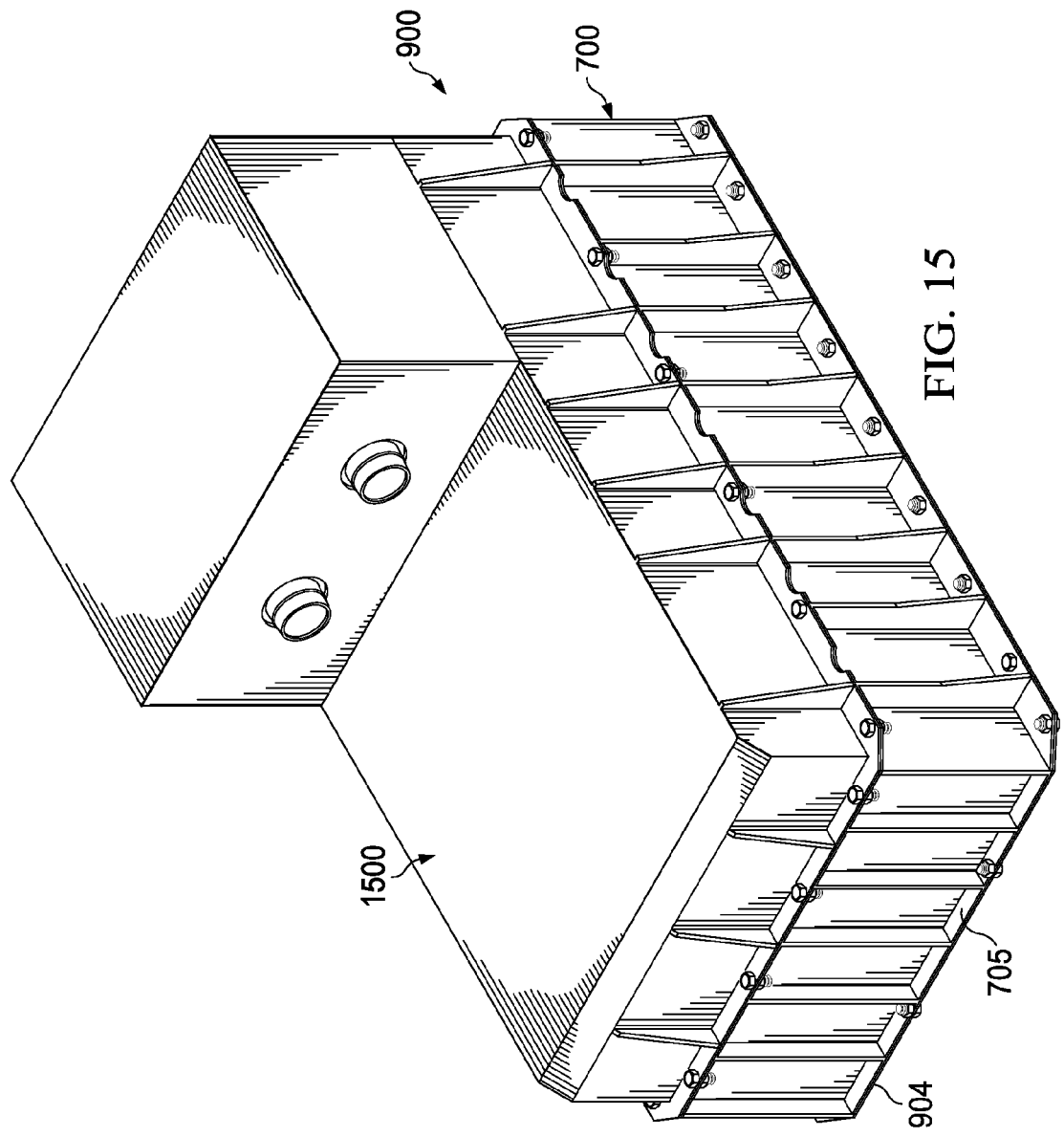
FIG. 15 is an illustration of a covered battery system in accordance with an advantageous embodiment.

With reference now to FIG. 15, an illustration of a covered battery system is depicted in accordance with an advantageous embodiment. As depicted, battery system 900 from FIG. 9 has cover 1500 associated with battery system 900. Cover 1500 covers terminals 1000 from FIG. 10 for battery system 900.

Figure 16:
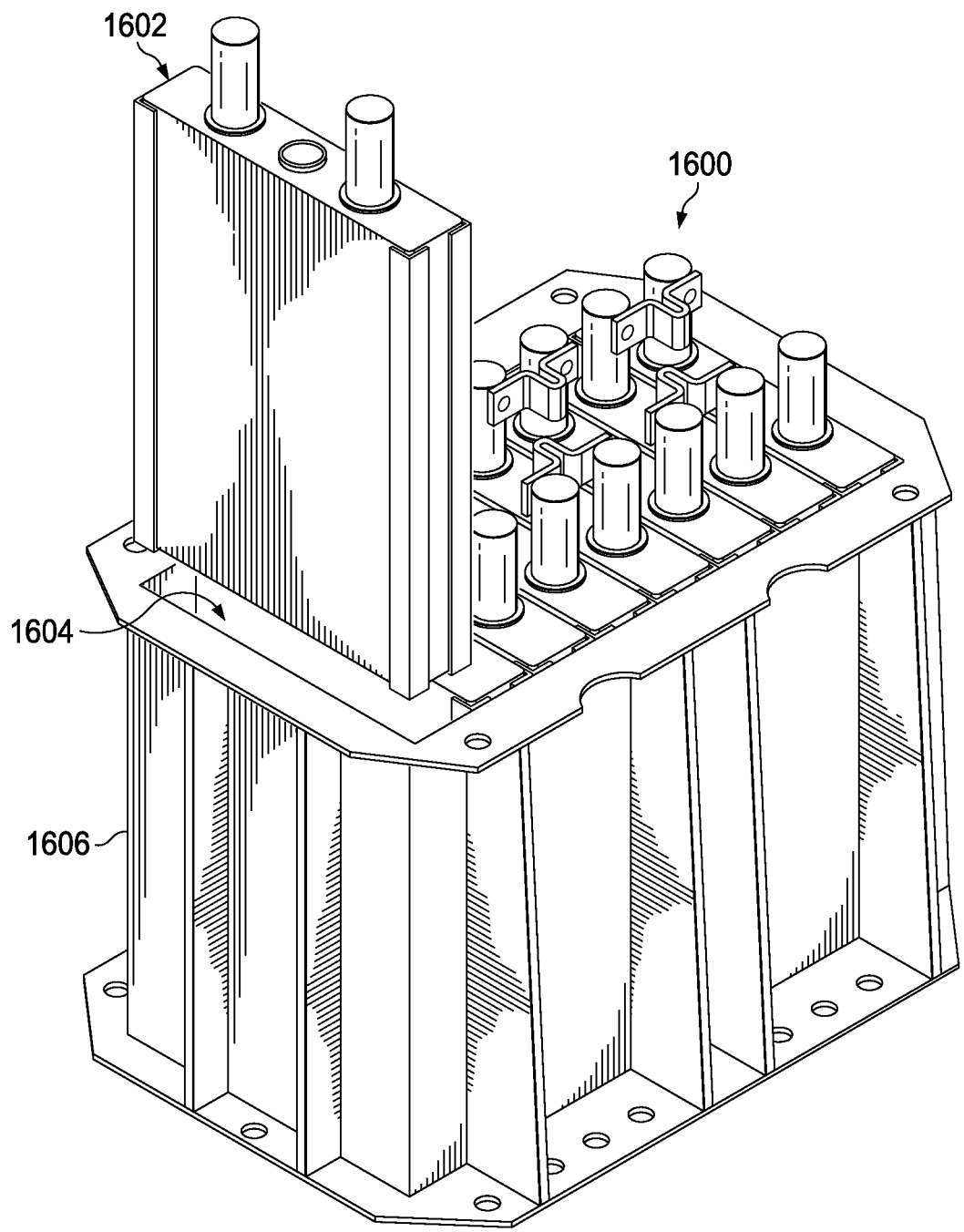
FIG. 16 is an illustration of a battery system with a battery cell removed in accordance with an advantageous embodiment.

In FIG. 16, an illustration of a battery system with a battery cell removed is depicted in accordance with an advantageous embodiment. In this illustrative example, battery system 1600 is another example of one implementation for battery system 304 in FIGS. 3A and 3B. As depicted, battery cell 1602 has been removed from channel 1604 in housing 1606 of battery system 1600.

Turning now to FIG. 17, an illustration of a battery cell associated with an assembly is depicted in accordance with an advantageous embodiment. Battery cell 1700 is an example of one implementation for a battery cell in number of battery cells 318 in FIG. 3B and/or battery cell 408 in FIG. 4.

As depicted, battery cell 1700 has cylindrical shape 1703. Battery cell 1700 has first end 1702, second end 1704, and side 1706. Further, battery cell 1700 has surface 1708.

Assembly 1710 is associated with battery cell 1700. Assembly 1710 includes members 1712, 1714, 1716, and 1718. These members are positioned relative to battery cell 1700 such that the members are in contact with surface 1708 of battery cell 1700. In this illustrative example, members 1712, 1714, 1716, and 1718 are substantially equally spaced apart along side 1706 of battery cell 1700.

With reference now to FIG. 18, an illustration of a battery cell associated with an assembly is depicted in accordance with an advantageous embodiment. In this illustrative example, battery cell 1700 is associated with additional members in assembly 1710, as compared to battery cell 1700 in FIG. 17.

In particular, members 1800, 1802, and 1804 in assembly 1710 are associated with battery cell 1700. Further, each of members 1800, 1802, and 1804 are arranged to encircle battery cell 1700 such that each of members 1800, 1802, and 1804 meet and/or connect to all of members 1712, 1714, 1716, and 1718.

Figure 19:
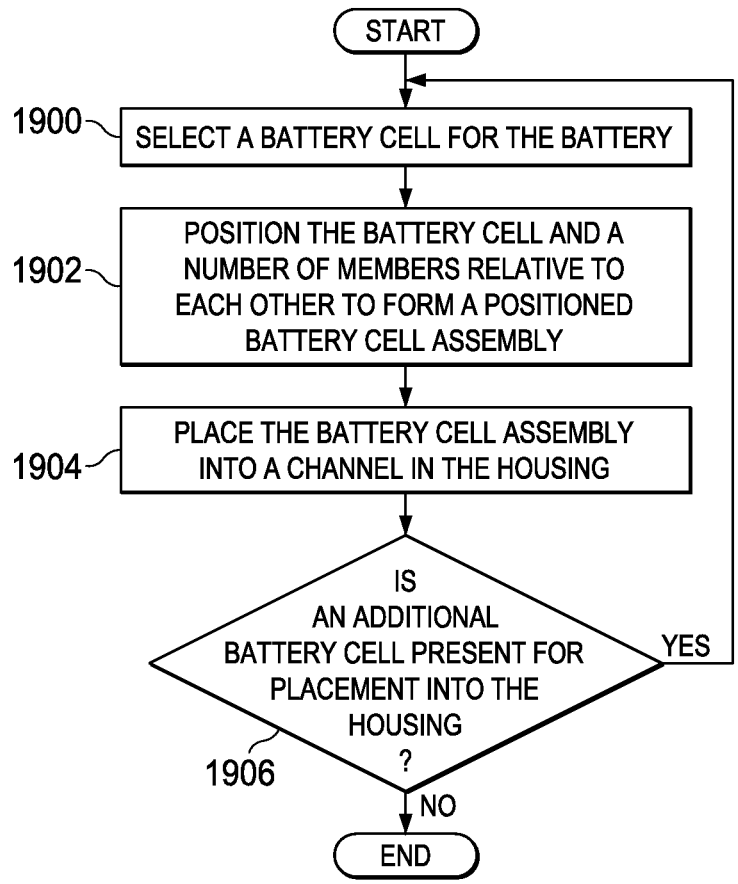
FIG. 19 is an illustration of a flowchart of a process for manufacturing a battery in accordance with an advantageous embodiment.

With reference now to FIG. 19, an illustration of a flowchart of a process for manufacturing a battery is depicted in accordance with an advantageous embodiment. The process illustrated in FIG. 19 may be used to manufacture battery 314 in battery system 304 in FIGS. 3A and 3B.

The process begins by selecting a battery cell for the battery (operation 1900). The process then positions the battery cell and a number of members relative to each other to form a positioned battery cell assembly (operation 1902). A number of grooves is formed by the number of members and a surface of the battery cell in these examples. As depicted, the members with the battery cell provide for alignment of the battery cell when placed into a channel.

The process then places the battery cell assembly into a channel in the housing (operation 1904). The number of members physically separates the battery cell from the housing, and an adhesive in the number of grooves connects the battery assembly to the housing.

A determination is then made as to whether an additional battery cell is present for placement into the housing (operation 1906). If an additional battery cell is present, the process returns to operation 1900. Otherwise, the process terminates.

Figure 20:
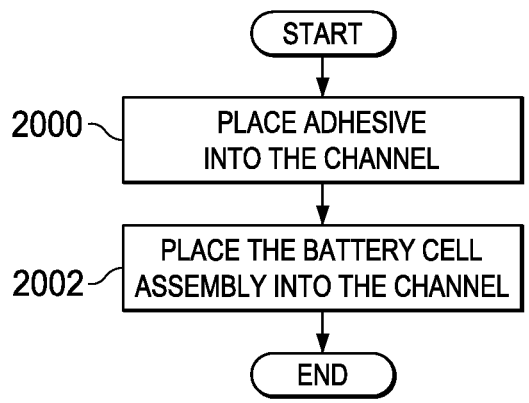
FIG. 20 is an illustration of a flowchart of a process for placing a battery assembly into a channel in accordance with an advantageous embodiment.

With reference now to FIG. 20, an illustration of a flowchart of a process for placing a battery assembly into a channel is depicted in accordance with an advantageous embodiment. The process illustrated in FIG. 20 is an example of one implementation of operation 1904 in FIG. 19.

In this example, the process begins by placing adhesive into the channel (operation 2000). Thereafter, the process places the battery cell assembly into the channel (operation 2002), with the process terminating thereafter.

Figure 21:
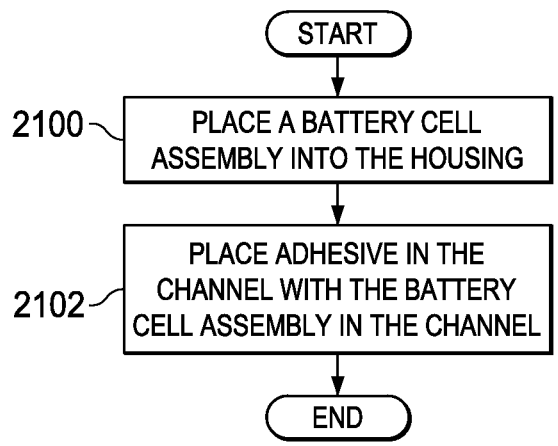
FIG. 21 is an illustration of a flowchart of a process for placing a battery assembly into a channel housing in accordance with an advantageous embodiment.

With reference now to FIG. 21, an illustration of a flowchart of a process for placing a battery assembly into a channel housing is depicted in accordance with an advantageous embodiment. The process illustrated in FIG. 21 is an example of another implementation of operation 1904 in FIG. 19. In this illustrative example, the process provides an edge fitting, alignment, and control method for installation of battery cells.

The process begins by placing a battery cell assembly into the housing (operation 2100). Thereafter, adhesive is placed in the channel with the battery cell assembly in the channel (operation 2102), with the process terminating thereafter. The battery cell assembly has grooves that are configured to control the amount of adhesive used. Further, the grooves provide a capability to define a desired thickness for the adhesive. The adhesive also may provide electrical isolation for the battery cell in addition to the members.

Figure 22:
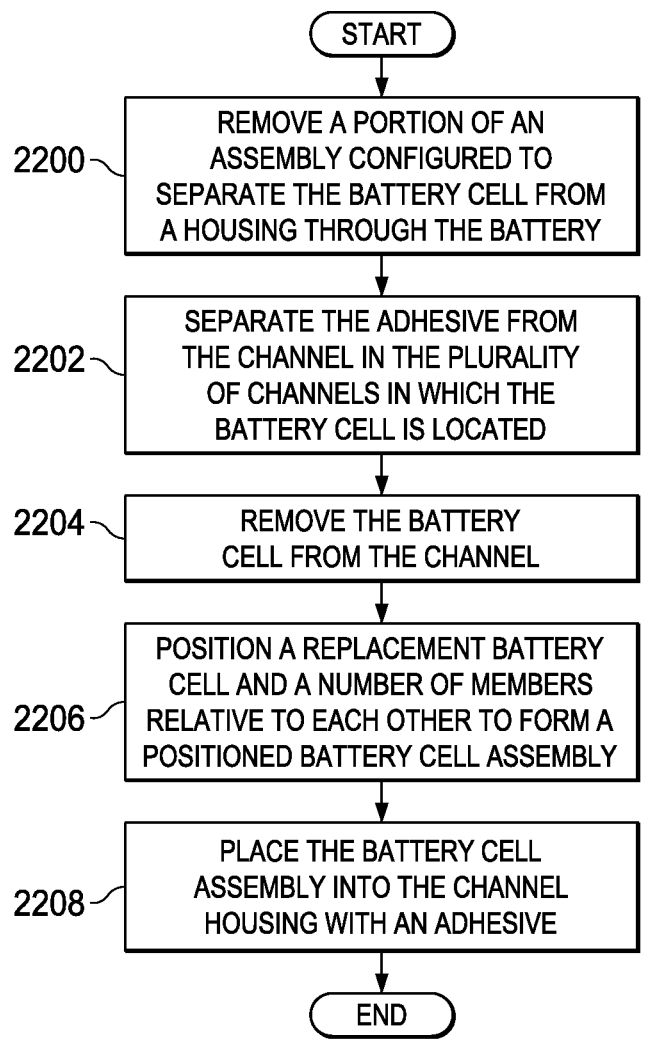
FIG. 22 is an illustration of a flowchart of a process for replacing a battery cell in a battery in accordance with an advantageous embodiment.

With reference now to FIG. 22, an illustration of a flowchart of a process for replacing a battery cell in a battery is depicted in accordance with an advantageous embodiment. The process illustrated in FIG. 22 may be used to replace a battery cell within number of battery cells 318 from battery 314 in FIG. 3B.

The process begins by removing a portion of an assembly configured to separate the battery cell from a housing through the battery (operation 2200). The process then separates the adhesive from the channel in the plurality of channels in which the battery cell is located (operation 2202). The process then removes the battery cell from the channel (operation 2204). Thereafter, a replacement battery cell and a number of members are positioned relative to each other to form a positioned battery cell assembly (operation 2206). The process then places the battery cell assembly into the channel housing with an adhesive (operation 2208), with the process terminating thereafter. Operation 2208 may be implemented using the operations illustrated in FIGS. 20 and 21, depending on the particular implementation.

Figure 23:
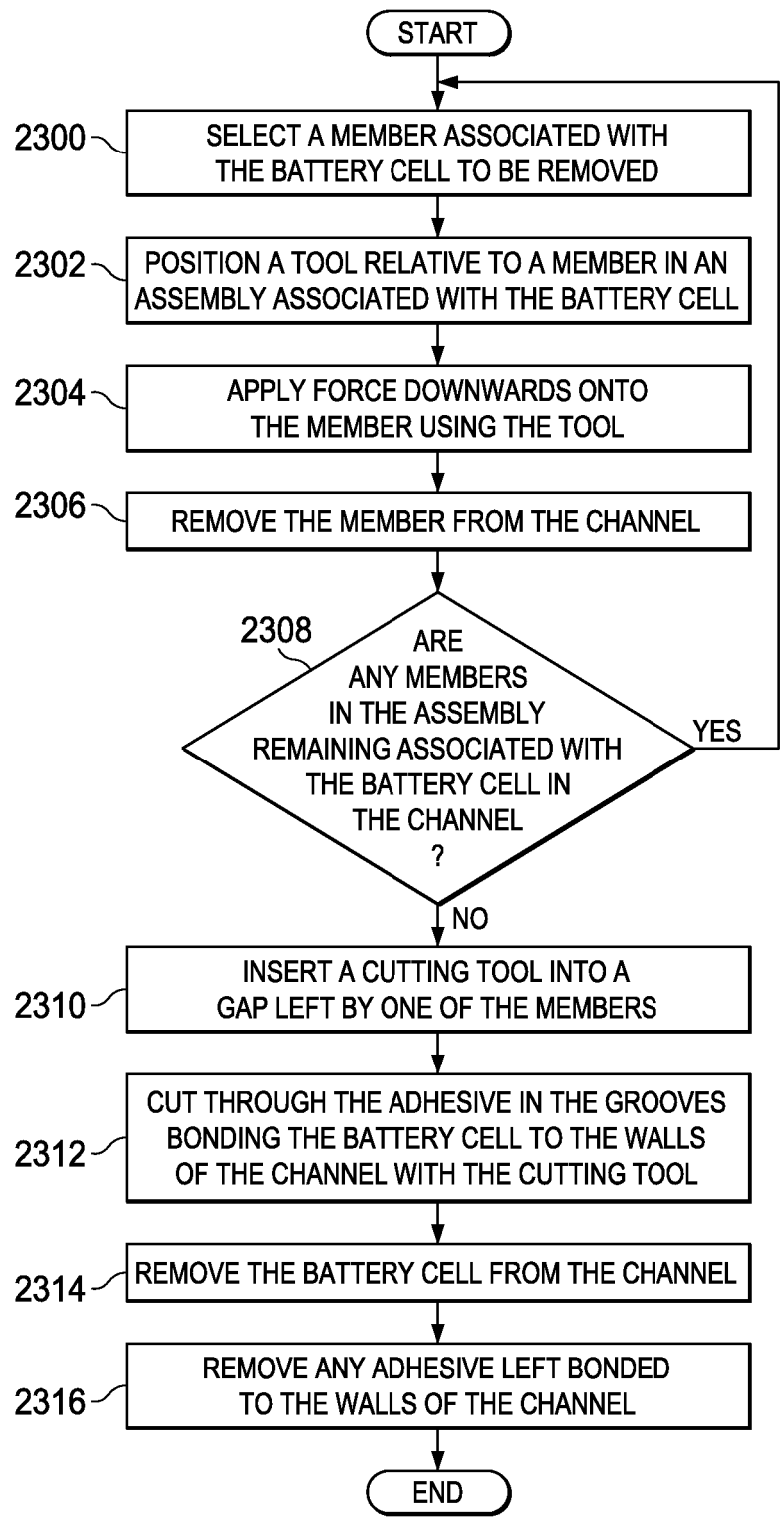
FIG. 23 is an illustration of a flowchart of a process for removing a battery cell in a battery in accordance with an advantageous embodiment.

With reference now to FIG. 23, an illustration of a flowchart of a process for removing a battery cell in a battery is depicted in accordance with an advantageous embodiment. The process illustrated in FIG. 23 may be implemented to remove a battery cell in number of battery cells 318 from a channel in plurality of channels 324 in housing 316 in FIG. 3B.

The process begins by selecting a member associated with the battery cell to be removed (operation 2300). Thereafter, the process positions a tool relative to a member in an assembly associated with the battery cell (operation 2302). In operation 2302, the tool is positioned over the member. Thereafter, force is applied downwards onto the member using the tool (operation 2304). The force applied to the member moves the member downwards through the channel and separates the member from adhesive bonding the member to the walls of the channel and/or the battery. In operation 2304, force is applied to the member until the member has moved a sufficient amount to allow the member to be removed from the channel.

Next, the member is removed from the channel (operation 2306). A determination is made as to whether any members in the assembly remain associated with the battery cell in the channel (operation 2308). If any members in the assembly remain associated with the battery cell, the process returns to operation 2300, as described above. Otherwise, the process inserts a cutting tool into a gap left by one of the members (operation 2310). In operation 2310, the cutting tool may comprise a wire connected to a saw frame. Thereafter, the cutting tool cuts through the adhesive in the grooves bonding the battery cell to the walls of the channel (operation 2312).

The battery cell is then removed from the channel (operation 2314). Next, any adhesive left bonded to the walls of the channel is removed (operation 2316), with the process terminating thereafter.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the different advantageous embodiments provide an apparatus for use in installing battery cells in a housing and removing battery cells from the housing. In one advantageous embodiment, an apparatus comprises a number of battery cells, a housing, and an assembly. The housing is configured to hold the number of battery cells. The assembly is configured to separate a battery cell in the number of battery cells from the housing. The assembly is configured to electrically insulate the number of battery cells from the housing and has a plurality of channels. A number of grooves is formed by the assembly and a surface of the battery cell.

The electrical insulation between the number of battery cells and the housing provided by the assembly eliminates the need to wrap the number of battery cells with insulating tape. In this manner, using the assembly in the place of insulating tape reduces the cost and time for installing the number of battery cells in the housing.

Further, adhesive present in the number of grooves and used to bond the number of battery cells and the housing may provide additional electrical insulation between the number of battery cells and the housing. The adhesive may cause different thicknesses in different grooves in the number of grooves. The thickness of the adhesive may be selected to provide a desired amount of thermal conductivity.

The different advantageous embodiments provide an apparatus that allows a single battery cell to be removed from a housing without affecting other battery cells in the housing and/or other portions of the housing. In this manner, the housing does not need to be disassembled to remove a single battery cell.

Referring again to FIGS. 5-7, a battery cell-edge fitting approach is disclosed in one or more of the different illustrative examples that provides positional accuracy for installing a number of battery cells to assemble a battery. The battery cell-edge fitting approach allows visualization of how a battery cell will fit into a channel and allows alignment of the battery cell within the channel to correct for or prevent an uneven fit of the battery cell in the channel. As such, this approach provides for immediate accurate fit and alignment of battery cells with grooves and walls contacting a battery cell.

Thus, this improved fitting methodology aids in early detection of assembly/device errors. Furthermore, this improved fitting methodology minimizes problems associated with poor and/or uneven contact between a battery cell, walls of the channel, and the grooves between the walls of the channel and the battery cell. For instance, the improved methodology reduces the amount or quantity of entrapped air and thermal conductivity issues associated with poor surface contacts. Thus, this methodology may result in a reduction in assembly testing and reworking tasks.

Advantageously, as discussed in the illustrative examples in FIGS. 5-7, the battery cell-edge fitting approach provides a multi-level integrated approach to achieve improved cell-to-cell isolation properties. For instance, each battery cell, such as, for example, battery cell 500 in FIG. 5, that is inserted into a channel, such as channel 1300 in FIG. 13, has wall-to-wall isolation provided by walls of the housing, such as first plurality of walls 706 and second plurality of walls 708 of housing 700 in FIG. 7, and a controlled amount of adhesive, such as adhesive 1200 in FIG. 12, applied to each surface of the battery cell and grooves around the battery cell.

Advantageously, this multi-level integrated inventive isolation approach to each battery cell provides built-in isolation, using the controlled amount of adhesive, such that battery-to-battery spacing may be minimized. The members of the assembly are configured to control the amount of adhesive in a desired manner.

Thus, the disclosed inventive stacking approach utilizing, for example, adhesive 1200, first plurality of walls 706, second plurality of walls 708, members 506, 506, 508, and 600, and the grooves formed by the members, such as groove 518, provides a denser battery package scheme than many conventional isolation techniques. For instance, a conventional isolation approach of wrapping each battery cell individually using two layers of conductive tape would increase width of battery cell. As such, the present embodiments provide for a reduction in the layers of conductive tape needed for isolation and/or other suitable isolation requirements. Thus, the weight contribution from a battery pack, battery array, or battery channelized approach, using principles of the present disclosure, is reduced.

Accordingly, the more complex or larger the battery pack or battery array is, the greater and/or more significant are the savings in weight and potential fuel costs associated therewith utilizing the disclosed battery isolation techniques.

Advantageously, the isolation techniques discussed above reduce the number of steps required for assembly a battery pack or battery array. For example, little or no wrapping of conductive tape may be needed. Thus, labor intensive tasks and/or the steps for performing labor intensive tasks, such as fault diagnosis and battery removal, are reduced to provide increased worker productivity.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages, as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for installation of a battery cell, the method comprising:
    positioning the battery cell and a number of members relative to each other to form a battery cell assembly, wherein a number of grooves is formed by the number of members and a surface of the battery cell; and placing the battery cell assembly into a channel in a housing, wherein the number of members physically separates the battery cell from the housing, and an adhesive in the number of grooves connects the battery cell assembly to the housing;

wherein the channel provides electrical isolation to the battery cell;

wherein the battery cell has terminals located at a first end;

wherein the battery cell assembly comprises a plurality of the battery cells, and separates and electrically insulates the battery cells from the housing, the battery cell assembly comprising at least two separate members attached to each battery cell, each of the at least two separate members extending between the first end of the battery cell and past a second end of the battery cell; and wherein the number of grooves are defined between side edges of the at least two separate members with respect to corresponding surfaces of the battery cell, the number of grooves each accept an amount of the adhesive corresponding to a thickness of the side edges of the at least two separate members.

2. The method of claim 1,
wherein the battery cell assembly comprises at least one gap in which the battery cell may be removed or replaced using the gap.

3. The method of claim 1,
wherein the battery cell assembly comprises a number of members configured to cover a first portion of the surface of the battery cell; and
wherein the number of grooves is on a second portion of the surface of the battery cell not covered by the number of members.

4. The method of claim 3,
Wherein the battery has the first end and the second end; the first end is configured to be placed into the channel; a groove in the number of grooves is located on the first end, and the adhesive is located in the groove.

5. The method of claim 3,
wherein the battery cell has a number of sides; the number of members has a first thickness at the number of sides; the groove in the number of grooves is located on the number of sides; and the adhesive has a second thickness in the groove that is substantially equal to the first thickness.

6. The method of claim 4,
wherein the number of members has a first thickness at the first end and the adhesive has a second thickness in the groove that is substantially equal to the first thickness.

7. The method of claim 1,
wherein the adhesive electrically insulates the battery cell from the housing; and
wherein the adhesive provides a desired amount of thermal conductivity, and the adhesive in the number of grooves forms a path for heat flow from the battery cell to the housing.

8. The method of claim 7,
wherein the housing has a side configured to be connected to a cooling system such that heat passes in the path from the battery cell through the adhesive and the housing to the cooling system when the battery cell is placed into the plurality of channels and the side is connected to the cooling system.

9. The method of claim 1,
wherein the adhesive is selected from one of a group comprising a room temperature vulcanizing (RTV) silicone, thermal plastic material, polyvinyl acetate, an epoxy material, polyurethane, a cyanoacrylate polymer, and a material that has a desired level of electrical insulation.

10. The method of claim 1,
wherein the housing has a first side and a second side;
wherein the housing comprises a cover that is connected to the second side of the housing; and
wherein the battery cell is bonded to the cover using the adhesive.

11. The method of claim 1,
wherein the housing, the assembly, and the battery cell form a battery.

12. The method of claim 1,
wherein the battery cell has a shape selected from one of a cuboid and a cylinder.

13. The method of claim 1,
wherein the housing is comprised of a material selected from one of an electrically conductive material, an electrically insulating material, a heat conducting material, a heat insulating material, metal, ceramic, fiberglass, a composite material, aluminum, and steel.

14. The method of claim 1, wherein the step of placing the battery cell assembly into the channel in the housing such that the adhesive is present in the number of grooves, wherein the adhesive connects the battery cell assembly to the housing comprises:
placing the adhesive into the channel; and
placing the battery cell assembly into the channel in the housing after the step of placing the adhesive into the channel such that the adhesive is present in the number of grooves, wherein the adhesive connects the battery cell assembly to the housing.

15. The method of claim 1, wherein the step of placing the battery cell assembly into the channel in the housing such that the adhesive is present in the number of grooves, wherein the adhesive connects the battery cell assembly to the housing comprises:
placing the battery cell assembly into the channel in the housing; and
placing the adhesive into the channel with the battery cell assembly in the channel, such that the adhesive is present in the number of grooves and wherein the adhesive connects the battery cell assembly to the housing.

16. A method for replacing a battery cell, the method comprising:
removing at least a portion of an assembly configured to separate the battery cell from a housing for the battery cell, wherein the assembly is configured to electrically insulate the battery cell from walls in a channel of the housing;
separating an adhesive in a number of grooves from the channel in a plurality of channels; and
removing the battery cell from the channel;
wherein the number of grooves is formed by a number of members of the assembly and a surface of the battery cell;
wherein the adhesive connected a battery cell assembly to the housing;
wherein the channel provides electrical isolation to the battery cell;
wherein the battery cell has terminals located at a first end;
wherein the battery cell assembly comprises a plurality of the battery cells, and separates and electrically insulates the battery cells from the housing, the battery cell assembly comprising at least two separate members attached to each battery cell, each of the at least two separate members extending between the first end of the battery cell and past a second end of the battery cell; and wherein the number of grooves are defined between side edges of the at least two separate members with respect to corresponding surfaces of the battery cell, the number of grooves each accept an amount of the adhesive corresponding to a thickness of the side edges of the at least two separate members.

17. The method of claim 16, wherein the step of separating the adhesive from the plurality of channels comprises:
cutting the adhesive such that the adhesive is separated from the channel to allow removal of the battery cell from the channel.

18. The method of claim 16, wherein the step of removing the at least a portion of the assembly configured to separate the battery cell from the housing for the battery cell, wherein the assembly is configured to electrically insulate the battery cell from the walls in the channel of the housing comprises:
applying force to a member in the assembly at a first side of the housing using a tool to move the member through the channel; and
removing the member from the channel from a second side of the housing.

\* \* \* \* \*